US010432308B1

(12) United States Patent
Turgeon et al.

(10) Patent No.: US 10,432,308 B1
(45) Date of Patent: Oct. 1, 2019

(54) SATELLITE SYSTEM USING AN RF GBBF FEEDER UPLINK BEAM FROM A GATEWAY TO A SATELLITE, AND USING AN OPTICAL ISL FROM THE SATELLITE TO ANOTHER SATELLITE

(71) Applicant: Space Systems/Loral, LLC, Palo Alto, CA (US)

(72) Inventors: Ghislain Turgeon, San Jose, CA (US); Vijaya Gallagher, Palo Alto, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

(21) Appl. No.: 16/111,008

(22) Filed: Aug. 23, 2018

(51) Int. Cl.
*H04B 10/118* (2013.01)
*H04B 7/185* (2006.01)

(52) U.S. Cl.
CPC ....... *H04B 10/118* (2013.01); *H04B 7/18513* (2013.01)

(58) Field of Classification Search
CPC combination set(s) only.
See application file for complete search history.

(56) References Cited

U.S. PATENT DOCUMENTS

| | | | |
|---|---|---|---|
| 5,966,371 | A | 10/1999 | Sherman |
| 6,016,124 | A | 1/2000 | Lo et al. |
| 6,246,498 | B1 | 6/2001 | Dishman et al. |
| 6,914,557 | B2 | 7/2005 | Chang et al. |
| 7,787,819 | B2 | 8/2010 | Walker et al. |

(Continued)

FOREIGN PATENT DOCUMENTS

| | | |
|---|---|---|
| EP | 3293894 A1 | 3/2018 |
| WO | WO2014189570 A2 | 11/2014 |

OTHER PUBLICATIONS

Walker, et al., "Architecture, Implementation and Performance of Ground-Based Beam Forming in the DBSD G1 Mobile Satellite System", 28th AIAA International Communications Satellite Systems Conference (ICSSC-2010), Aug. 30, 2010-Sep. 2, 2010, Published by the American Institute of Aeronautics and Astronautics, Inc., pp. 1-29.

(Continued)

*Primary Examiner* — Omar S Ismail
(74) *Attorney, Agent, or Firm* — Vierra Magen Marcus LLP

(57) ABSTRACT

A system described herein includes a ground based gateway subsystem configured to transmit an RF feeder uplink beam to a satellite, and a space based subsystem of the satellite configured to receive the RF feeder uplink beam and produce in dependence thereon an optical ISL beam that is transmitted to another satellite. The ground based gateway subsystem can include a ground based beamformer used to produce the RF feeder uplink beam. The optical ISL beam, produced by the space based subsystem and transmitted to the other satellite, can comprise a wavelength division multiplexed optical signal having RF frequencies within a same specified RF frequency range within which the other satellite is configured to transmit a plurality of RF service downlink beams, thereby eliminating any need for the other satellite to perform any frequency conversions when producing the plurality of RF service downlink beams in dependence on the optical ISL beam.

25 Claims, 13 Drawing Sheets

(56) References Cited

U.S. PATENT DOCUMENTS

| | | | |
|---|---|---|---|
| 8,135,338 B1 | 3/2012 | Gelon et al. | |
| 8,918,055 B2 | 12/2014 | Ramachandran et al. | |
| 9,742,488 B2 | 8/2017 | Ling et al. | |
| 2004/0110467 A1* | 6/2004 | Wang | H04B 7/18513 455/12.1 |
| 2005/0100339 A1 | 5/2005 | Tegge, Jr. | |
| 2005/0117914 A1 | 6/2005 | Chuah et al. | |
| 2006/0189275 A1* | 8/2006 | Karabinis | H04B 7/18521 455/12.1 |
| 2007/0072603 A1* | 3/2007 | Wang | H04B 7/18513 455/427 |
| 2007/0281612 A1 | 12/2007 | Benjamin et al. | |
| 2008/0051080 A1 | 2/2008 | Walker et al. | |
| 2009/0053995 A1* | 2/2009 | Moore, III | H04B 7/18521 455/13.1 |
| 2009/0202254 A1 | 8/2009 | Majumdar et al. | |
| 2010/0261440 A1* | 10/2010 | Corman | H01Q 3/26 455/91 |
| 2010/0309828 A1* | 12/2010 | Nguyen | H04B 7/18539 370/281 |
| 2012/0020280 A1* | 1/2012 | Jansson | H04B 7/18582 370/316 |
| 2012/0069918 A1* | 3/2012 | Chang | H04B 7/086 375/259 |
| 2012/0178363 A1* | 7/2012 | Moore, III | H04B 7/18521 455/13.2 |
| 2012/0328298 A1* | 12/2012 | Yi | H01Q 3/2676 398/96 |
| 2013/0088391 A1* | 4/2013 | Corman | H04B 7/10 342/365 |
| 2014/0362875 A1 | 12/2014 | Le Kernec et al. | |
| 2016/0204866 A1 | 7/2016 | Boroson et al. | |
| 2017/0093539 A1 | 3/2017 | Wang | |
| 2017/0214462 A1* | 7/2017 | Busche | H04B 7/18504 |
| 2017/0288769 A1* | 10/2017 | Miller | H04B 7/212 |
| 2017/0366262 A1 | 12/2017 | Turgeon et al. | |
| 2017/0366263 A1 | 12/2017 | Turgeon et al. | |
| 2018/0041275 A1 | 2/2018 | Gallagher et al. | |
| 2018/0054251 A1 | 2/2018 | Alex | |
| 2018/0069629 A1 | 3/2018 | Turgeon et al. | |
| 2018/0083678 A1 | 3/2018 | Alexander et al. | |

OTHER PUBLICATIONS

Allam, "Types of Beamforming", Adaptive Antennas, Lectures, Feb. 27, 2017, pp. 1-33.

Mata-Calvo, et al., "Optical Feeder Links for Very High Throughput Satellites—System Perspectives", Proceedings of the Ka and Broadband Communications, Navigation and Earth Observation Conference 2015, Ka Conference 2015, Oct. 12-14, 2015, Bologna, Italy.

Prabu K, et al., "Analysis of Optical Modulators for Radio Over Free Space Optical Communication Systems and Radio Over Fiber Systems", Annual IEEE India Conference, INDICON 2012, Dec. 2012, 1176-1179, 10.1109/INDCON.2012.6420795.

Kazaura et al., "RoFSO: A Universal Platform for Convergence of Fiber and Free-Space Optical Communication Networks", IEEE Communications Magazine, IEEE Service Center, Piscataway, US, vol. 48, No. 2, Feb. 2010, pp. 130-137.

Search Report dated Jan. 2, 2018, in European Application No. 17189303.5.

Office Action dated Dec. 14, 2017, in U.S. Appl. No. 15/394,512, filed Dec. 29, 2016.

Amendment dated Jan. 5, 2018, in U.S. Appl. No. 15/394,512, filed Dec. 29, 2016.

Notice of Allowance dated May 16, 2018, in U.S. Appl. No. 15/394,512, filed Dec. 29, 2016.

Supplemental Notice of Allowability dated Jun. 29, 2018, in U.S. Appl. No. 15/394,512, filed Dec. 29, 2016.

Ex Parte Quayle Action dated May 30, 2018, in U.S. Appl. No. 15/682,785, filed Aug. 22, 2017.

Response to Ex Parte Quayle Action dated May 30, 2018, in U.S. Appl. No. 15/682,785, filed Aug. 22, 2017.

Amendment dated Sep. 13, 2018, in European Patent Appl. No. 17189303.5.

Notice of Allowance dated Aug. 24, 2018, in U.S. Appl. No. 15/682,785, filed Aug. 22, 2017.

* cited by examiner

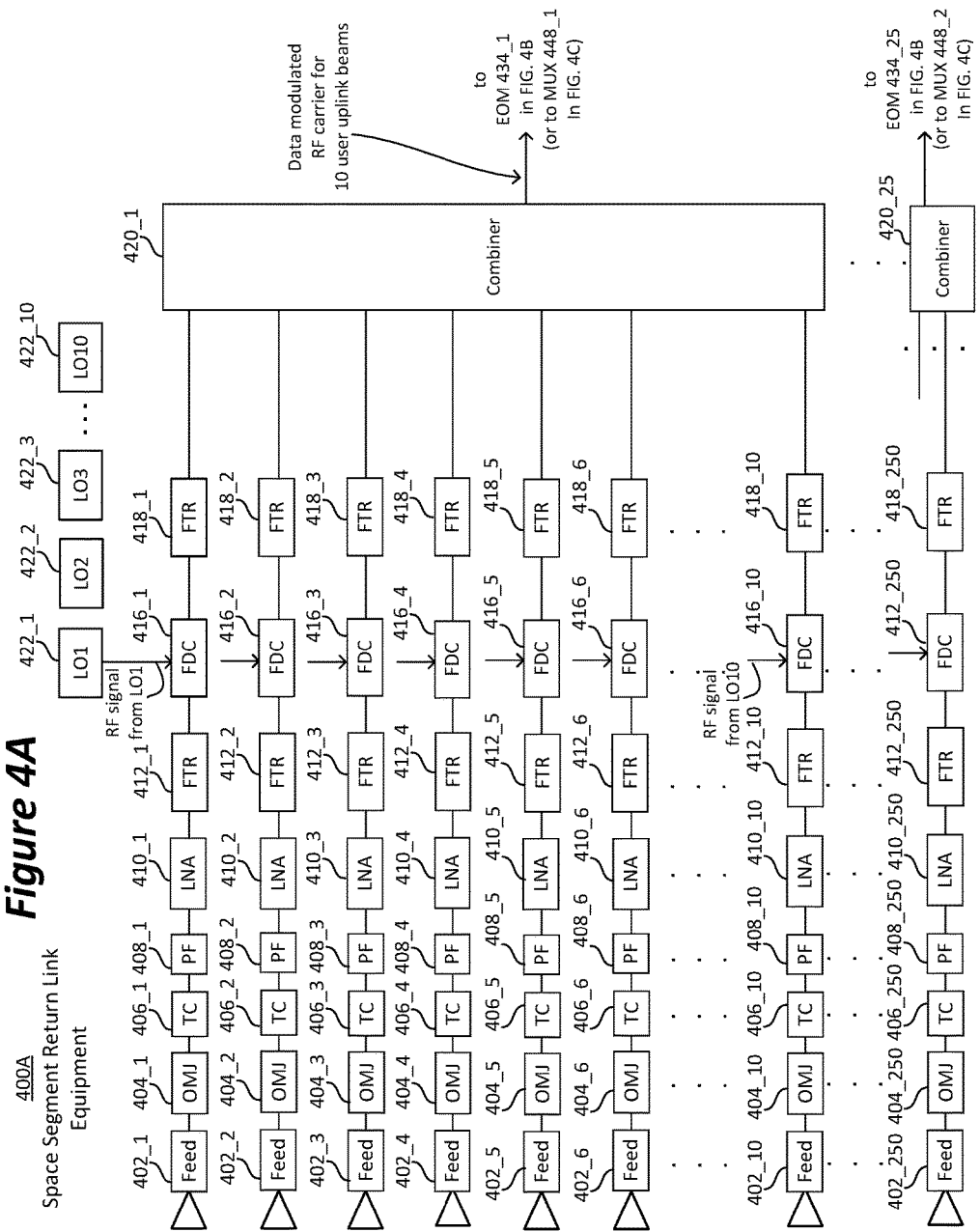

SATELLITE SYSTEM USING AN RF GBBF FEEDER UPLINK BEAM FROM A GATEWAY TO A SATELLITE, AND USING AN OPTICAL ISL FROM THE SATELLITE TO ANOTHER SATELLITE

RELATED APPLICATION

This application is related to U.S. patent application Ser. No. 15/682,785, filed Aug. 22, 2017, titled SATELLITE SYSTEM USING OPTICAL GATEWAYS AND GROUND BASED BEAMFORMING, published as US 2018/0069629 on Mar. 8, 2018 and issued as U.S. Pat. No. 10,142,021 on Nov. 27, 2018, which is incorporated herein by reference in its entirety.

BACKGROUND

There is an increasing need for large amounts of bandwidth to be routed between a ground based gateway and a spaced based satellite, as well as between space based satellites.

BRIEF DESCRIPTION OF THE DRAWINGS

FIG. 4A depicts a portion of space segment return link equipment, according to alternative embodiments of the present technology.

DETAILED DESCRIPTION

Certain embodiments of the present technology described herein relate to system and sub-system architectures for transmitting beams between a ground based gateway and a space based satellite, for transmitting inter-satellite-link (ISL) beams between space based satellites, and for transmitting service downlink beams from space based satellites to user terminals.

Prior to describing details of specific embodiments of the present technology, it is first useful to describe an exemplary wireless communication system with which embodiments of the present technology would be useful. An example of such a wireless communication system will now be described with reference to FIG. 1.

Figure 1:
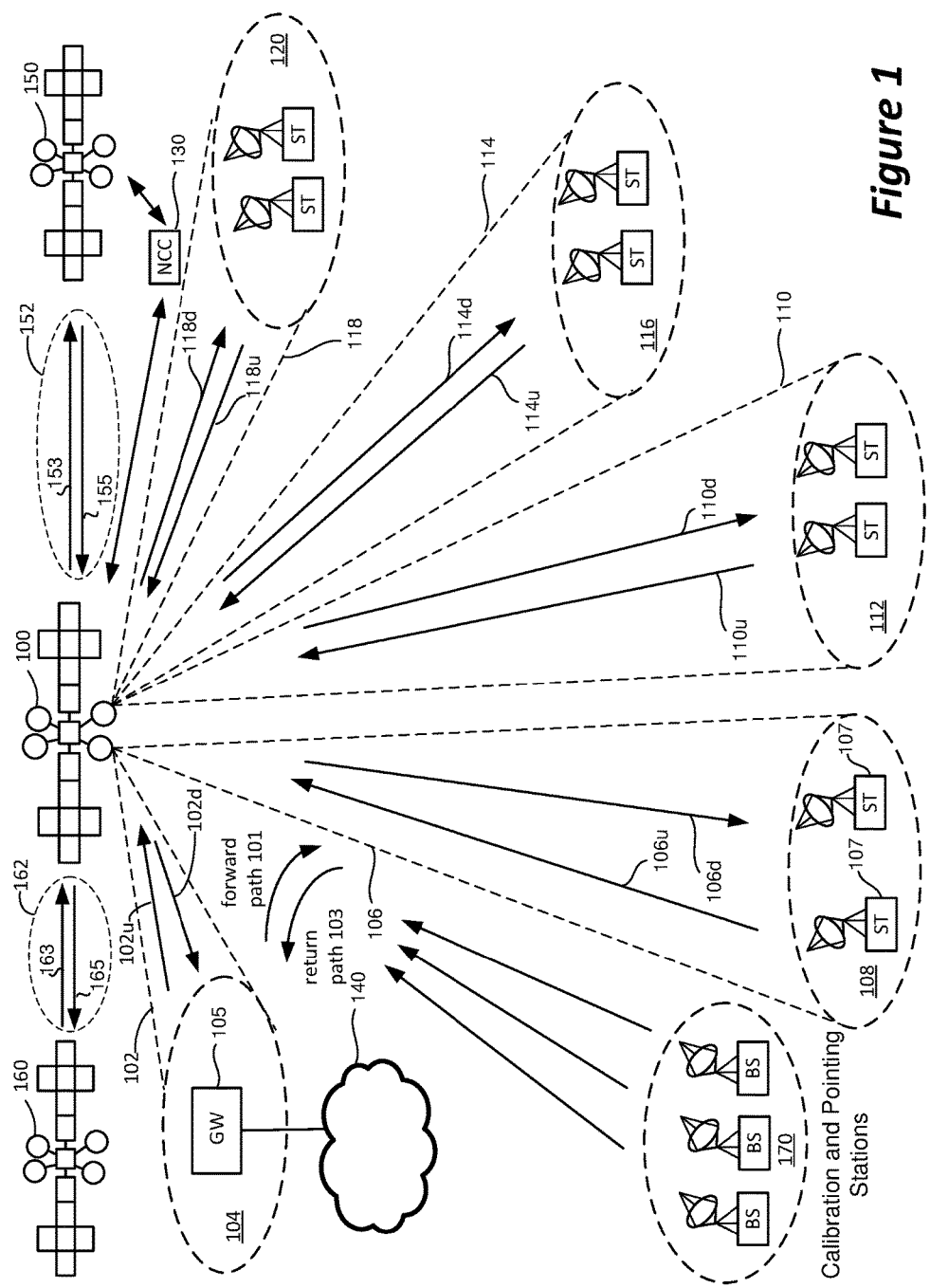
FIG. 1 is a block diagram describing a wireless communication system, which may be a satellite communication system.

FIG. 1 depicts a block diagram of a wireless communications system that includes a communication platform 100, which may be a satellite located, for example, at a geostationary or non-geostationary orbital location. Where a satellite is in a non-geostationary orbit, the satellite may be a low earth orbit (LEO) satellite. In other embodiments, other platforms may be used such as an unmanned aerial vehicle (UAV) or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway (GW) 105 and a plurality of subscriber terminals ST (including subscriber terminals 107). The term subscriber terminal may be used to refer to a single subscriber terminal or multiple subscriber terminals. A subscriber terminal ST is adapted for communication with the wireless communication platform 100, which as noted above, may be a satellite. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. For the remainder of this description, unless stated otherwise, it is assumed that the communication platform 100 is a satellite. Accordingly, platform 100 will often be referred to as satellite 100, and the wireless communication system will often be referred to as a satellite communication system. In accordance with certain embodiments, it is possible that a subscriber terminal with which one satellite wirelessly communicates is on a platform of or on another satellite.

In one embodiment, satellite 100 comprises a bus (e.g., spacecraft) and one or more payloads (e.g., the communication payload, an imaging payload, etc.). The satellite will also include a command and data handling system and multiple power sources, such as batteries, solar panels, and one or more propulsion systems, for operating the bus and the payload. The command and data handling system can be used, e.g., to control aspects of a payload and/or a propulsion system, but is not limited thereto.

The at least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which has both a feeder uplink 102u and a feeder downlink 102d. In one embodiment, feeder beam 102 is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. In one embodiment, a gateway is located in the same spot beam as one or more subscriber terminals. In certain embodiments the feeder uplink 102u is an optical beam. In other embodiments the feeder uplink 102u is an RF beam. Similarly, it is possible that the feeder downlink 102d is an optical beam or an RF beam, depending upon the embodiment.

Subscriber terminals ST and satellite 100 communicate over service beams, which are also known as user beams. For example, FIG. 1 shows service beams 106, 110, 114 and 118 for illuminating regions 108, 112, 116 and 120, respectively. In many embodiments, the communication system will include more than four service beams (e.g., sixty, one hundred, etc.). Each of the service beams have an uplink (106u, 110u, 114u, 118u) and a downlink (106d, 110d, 114d, 118d) for communication between subscriber terminals ST and satellite 100. Although FIG. 1 only shows two subscriber terminals STs within each region 108, 112, 116 and 120, a typical system may have thousands of subscriber terminals within each region. In the embodiments described herein, it is assumed that the service beams (both downlink and uplink) are RF beams, as opposed to optical beams.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102u of feeder beam 102, through a first signal path on satellite 100, and from satellite 100 to one or more subscriber terminals ST via downlink 106d of service beam 106. An uplink (e.g., 102u) of a feeder beam (e.g., 102) can also be referred to more succinctly as a feeder uplink beam, and the downlink (e.g., 106d) of a service beam (e.g., a 106) can also be referred to more succinctly as a service downlink beam. Although the above example mentions service beam 106, the example could have used other service beams.

Data can also be sent from the subscriber terminals STs over the return path 103 to gateway 105. In one example, communication over the return path comprises transmitting the data from a subscriber terminal (e.g., subscriber terminal 107 in service beam 106) to satellite 100 via uplink 106u of service beam 106, through a second signal path on satellite 100, and from satellite 100 to gateway 105 via downlink 102d of feeder beam 102. An uplink (e.g., 106u) of a service beam (e.g., 106) can also be referred to more succinctly as a service uplink beam, and the downlink 102d of feeder beam 102 can also be referred to more succinctly as a feeder downlink beam. Although the above example uses service beam 106, the example could have used any service beam.

FIG. 1 also shows that the satellite 100 can communicate with other satellites 150 and 160 over respective inter-satellite link (ISL) beams 152 and 162. For example, the satellite 100 can send data to the satellite 150 over a path 153 of the ISL beam 152, and can receive data from the satellite 150 over a path 155 of the ISL beam 152. Communication over a forward path can comprise, for example, transmitting data from the gateway 105 to the satellite 100 via the feeder uplink beam 102u, through a signal path on satellite 100, and from the satellite 100 to the satellite 150 via the path 153 of the ISL beam 152, through a signal path on the satellite 150, and then to one or more subscriber terminals ST via a service downlink beam. Communication over a return path can comprise, for example, transmitting data from a subscriber terminal to the satellite 150 via a service uplink beam, through a signal path on the satellite 150, and from the satellite 150 to the satellite 100 via the path 155 of the ISL beam 152, and from the satellite 100 to the gateway 105 via feeder downlink beam 102d. In still another example, the satellite 100 can receive data over a path 163 of the ISL beam 162 from the satellite 160, and can send data over a path 153 of the ISL beam 152 to the satellite 150. These are just a few examples of how a ground based gateway can communicate with satellites, satellites can communicate with one another, and how satellites can communicate with service terminals STs, which examples not intended to be all encompassing. All of the satellites 100, 150 and 160 shown in FIG. 1 can be in a geostationary orbit. Alternatively, all of the satellites 100, 150 and 160 shown in FIG. 1 can be in a non-geostationary orbital, e.g., in a low earth orbit (LEO), and such satellites may only send an optical ISL beam from one satellite to another when the other satellite comes into the view of the optical coverage area of the satellite. It is also possible that one or more of the satellites 100, 150 and 160 shown in FIG. 1 can be in a geostationary orbit, while one or more of the other satellites is within a non-geostationary orbital, e.g., in a low earth orbit (LEO). In this latter case, a geostationary satellite and a non-geostationary satellite (e.g., an LEO satellite) may only be able to send an optical ISL beam therebetween when one of the satellites comes into the view of the optical coverage area of the other satellite. More generally, satellites that are in different types of orbits can send optical ISLs to one another using embodiments of the present technology described herein. This enables satellites to operate as optical repeaters without needing to demodulate and remodulate optical signals being forwarded to another satellite. Instead, a satellite that is acting as an optical repeater may only need to amplify an optical ISL before it is passed onto another satellite, which can greatly simply the equipment onboard the satellite.

FIG. 1 also shows a Network Control Center (NCC) 130, which can include an antenna and modem for communicating with satellites 100, 150 and 160, as well as one or more processors and data storage units. Network Control Center 130 provides commands to control and operate satellites 100, 150 and 160. Network Control Center 130 may also provide commands to any of the gateways and/or subscriber terminals. It is also possible that the NCC includes transmitter and/or receiver optics for optically communicating with satellites 100, 150 and 160 or communicates with satellites 100, 150, and 160 through the optical gateway links such as beam 102.

FIG. 1 also shows calibration and pointing stations 170 that are used to determine amplitude and phase errors associated with forward path and return path signals 101 and 103, which amplitude and phase errors can be used by a ground based beam former (GBBF) (e.g., 230 in FIGS. 2A, 2B and 2C) to perform ground based beamforming, in accordance with certain embodiments of the present technology. More specifically, the amplitude and phase errors can be used as, or used to determine, amplitude and phase coefficients that are used by the GBBF 230 to perform ground based beamforming. In accordance with certain embodiments, the calibration and pointing stations 170 are part of a calibration subsystem. Such a calibration subsystem can also include one or more processors and data storage units. The calibration subsystem can control the transmission and reception of calibration signals, and can control the execution of algorithms and/or the like that are used to determine amplitude and phase errors and/or coefficients. The calibration subsystem may also be used for forward uplink power control and to correct for Doppler effects, but is not limited thereto.

In one embodiment, communication platform 100 implements the technology described below. In other embodiments, the technology described below is implemented on a different platform (or different type of satellite) in a different communication system. For examples, the communication platform can alternatively be a UAV or balloon, but is not limited thereto.

The architecture of FIG. 1 is provided by way of example and not limitation. Embodiments of the disclosed technology may be practiced using numerous alternative implementations.

Conventionally, a gateway (e.g., gateway 105) communicates with a satellite (e.g., satellite 100) using an antenna on the ground that transmits and receives RF (radiofrequency) signals to and from an antenna on the satellite. Certain embodiments of the present technology utilize optical components instead of antennas to transmit and receive optical signals between a gateway and a satellite or between satellites, as will be described in additional details below.

Certain embodiments of the present technology involve the use of analog-over free-space optical signals, which leads to an elegant architecture for a satellite repeater. Certain embodiments allow for the aggregation of multiple user links without requiring extra hardware associated with an onboard demodulator and remodulator, and thus reduce the mass, power and cost of the satellite, perhaps making the difference between being able to launch or not being able to launch the satellite. In addition, in accordance with specific embodiments where the uplink and downlink communication signals are modulated at transmit (forward) and receive (return) RF frequencies, no frequency conversion in the forward link is required on the satellite, thereby further simplifying the payload design. By contrast, previously envisioned free-space optical spacecraft architectures proposed demodulation of the optical signal, followed by routing to user link pathways and remodulation of the signal on user link RF frequencies.

Block diagrams for the communications subsystems for the ground and space segments, according to certain embodiments of the present technology, are described below with reference to FIGS. 2A, 2B, 2C, 3A, 3B, 4A, 4B, 4C, 5A, 5B and 5C. Certain embodiments use analog modulation and demodulation on the satellite, thus enabling optical feeder links without onboard processing.

Figure 2A:
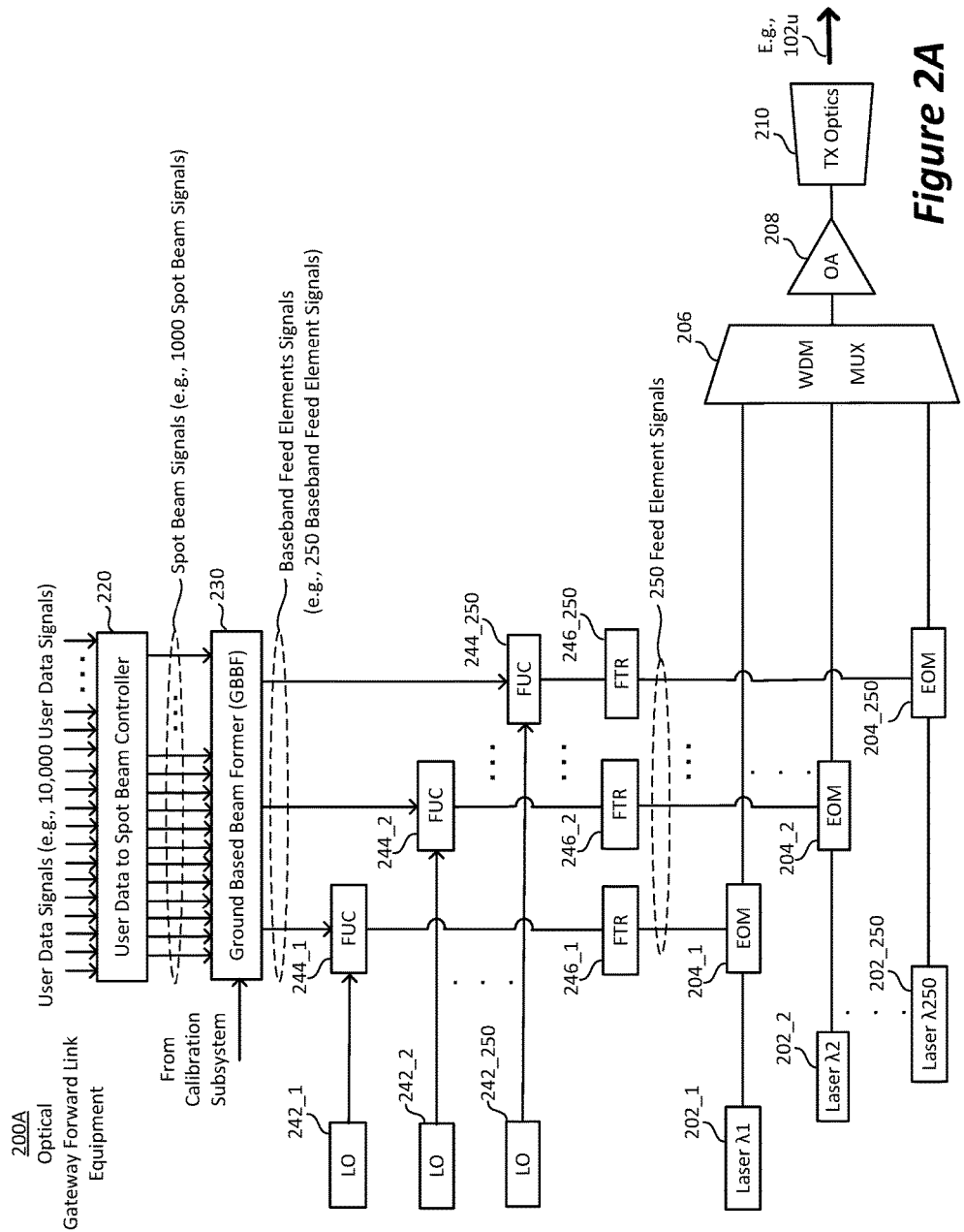
FIG. 2A depicts optical gateway forward link equipment, according to an embodiment of the present technology.
Figure 2B:
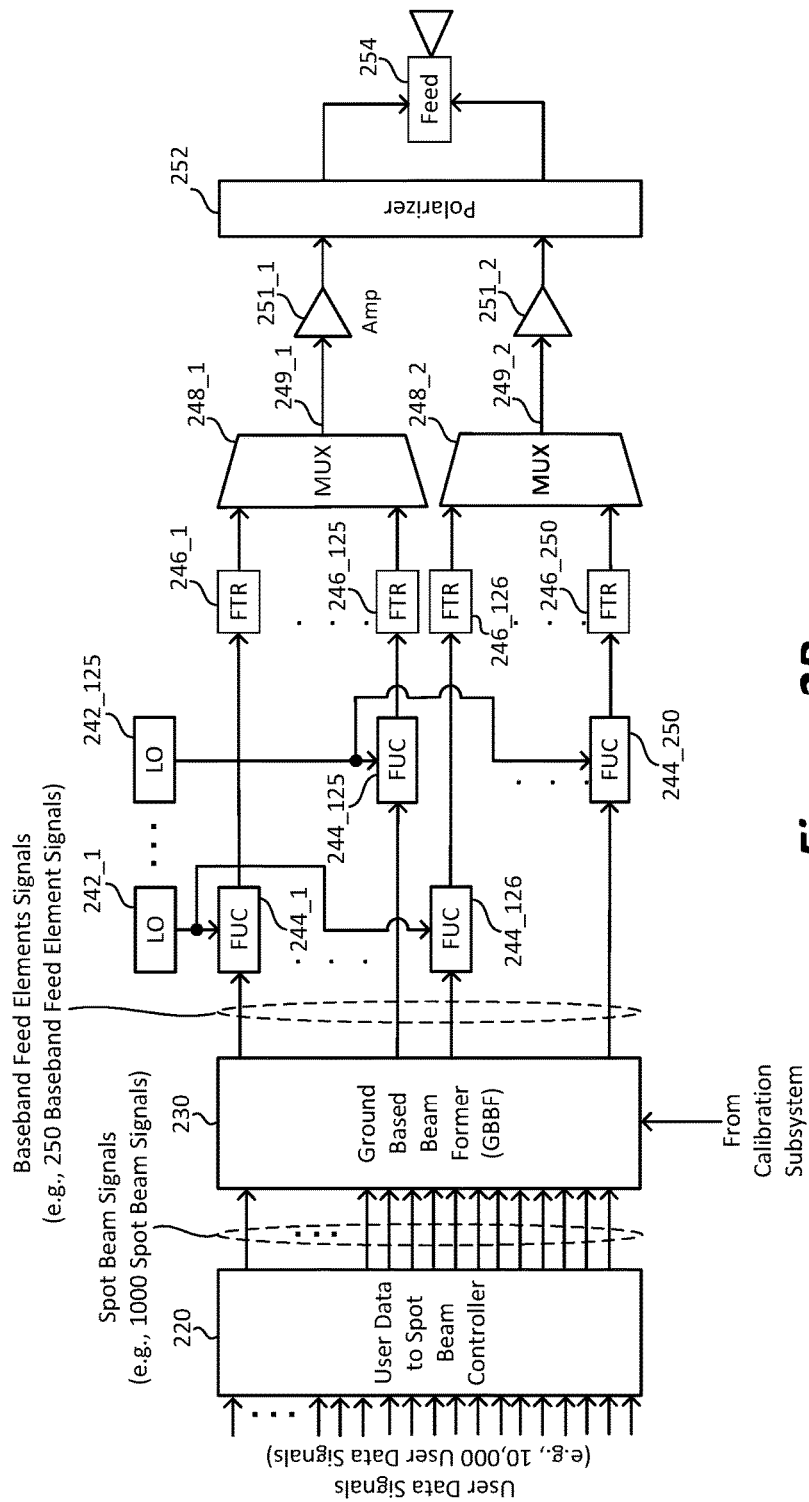
FIG. 2B depicts RF gateway forward link equipment, according to another embodiment of the present technology.
Figure 2C:
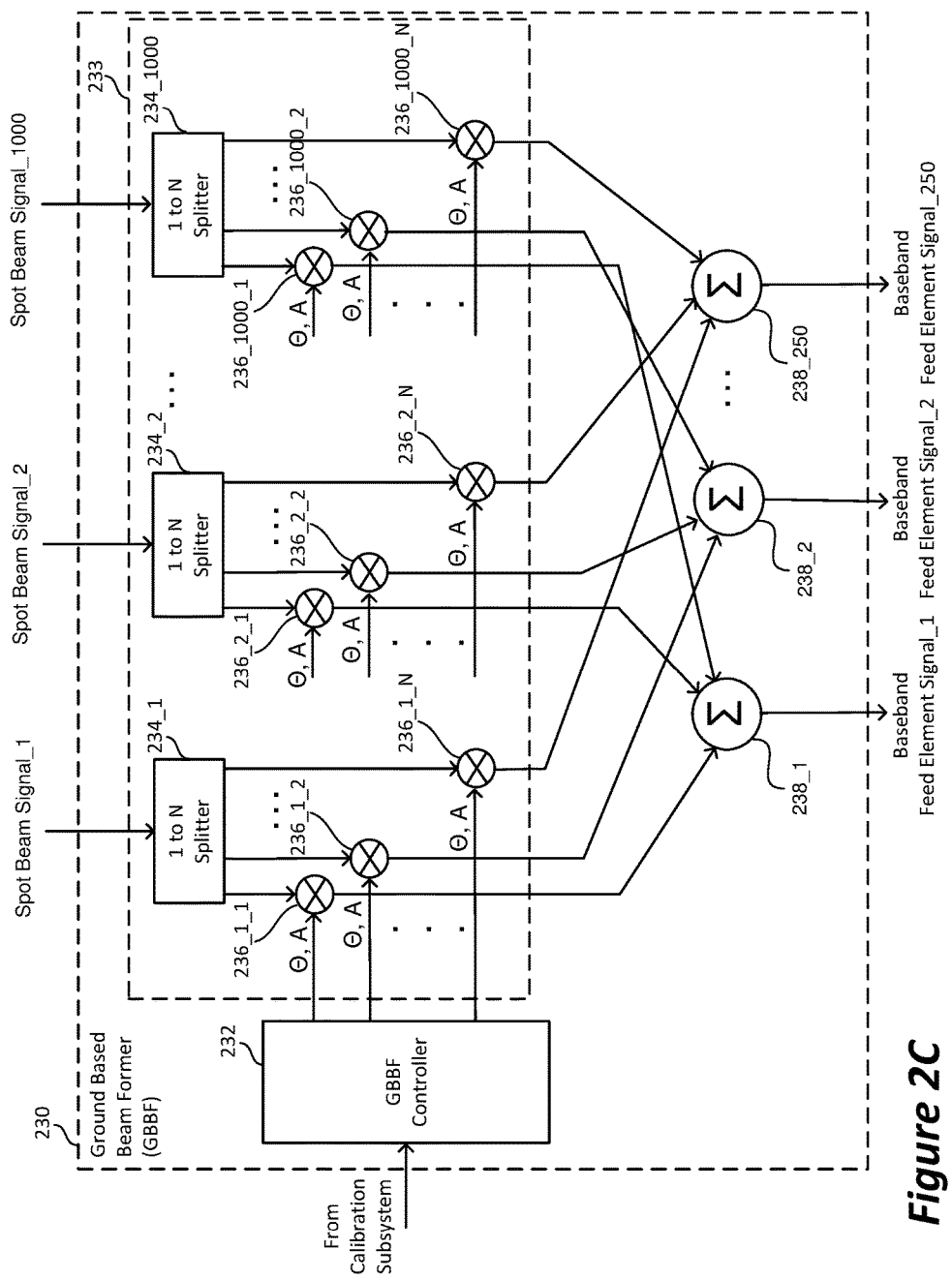
FIG. 2C depicts components of the ground based beamformer (GBBF) included in the gateway forward link equipment of FIGS. 2A and 2B, according to an embodiment of the present technology.
Figure 3A:
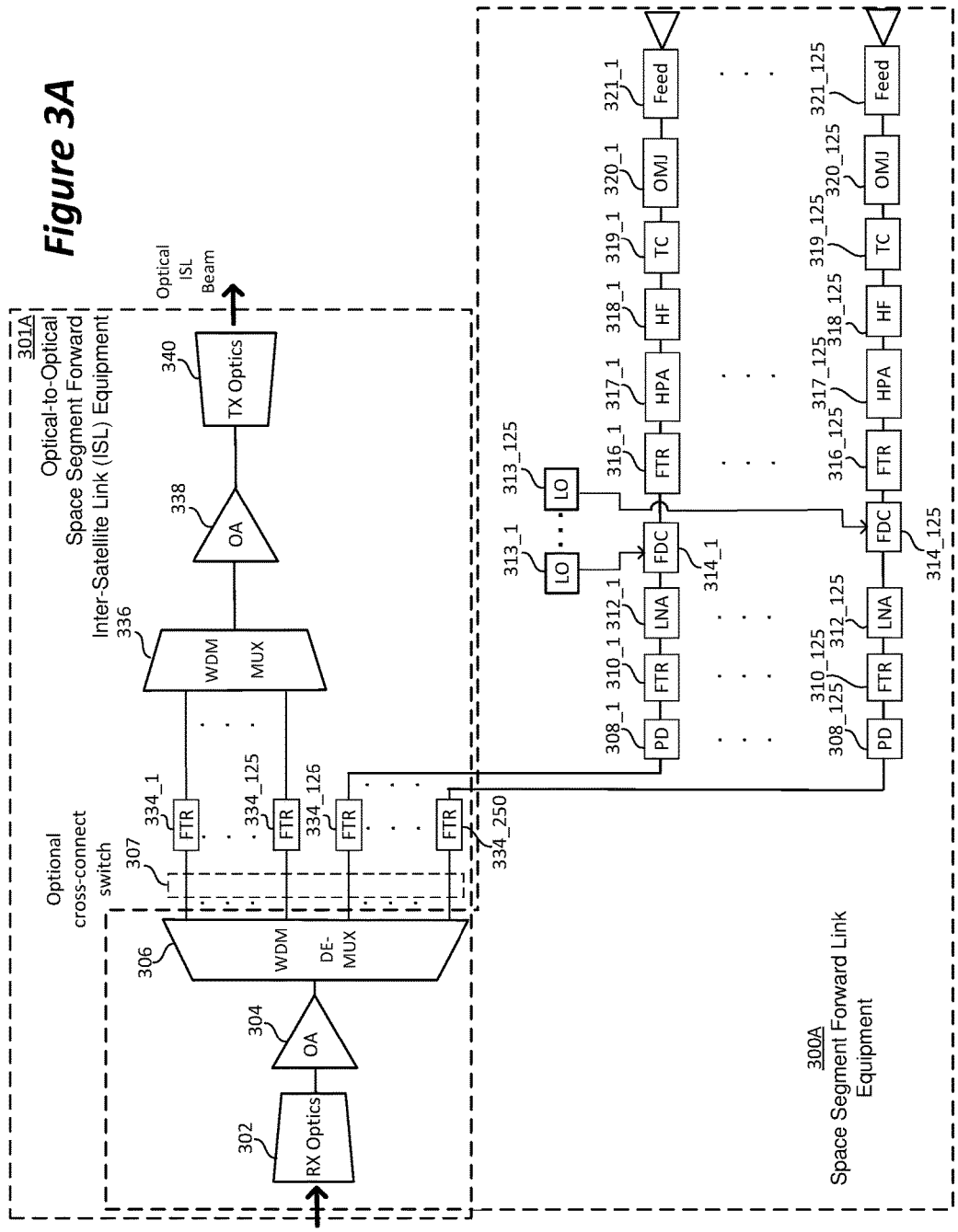
FIG. 3A depicts space segment forward link equipment, according to an embodiment of the present technology.
Figure 3B:
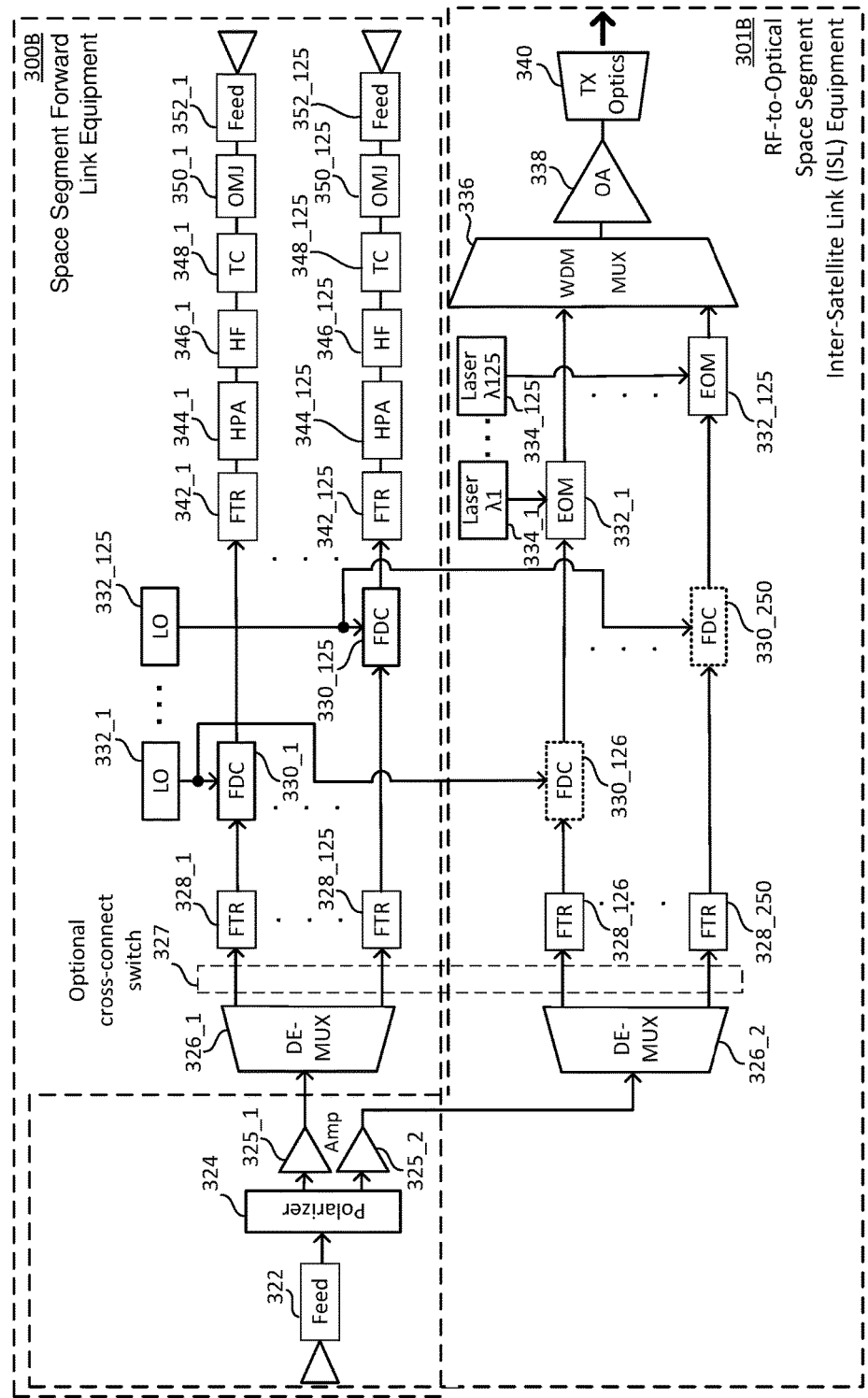
FIG. 3B depicts space segment forward link equipment, according to another embodiment of the present technology.
Figure 4B:
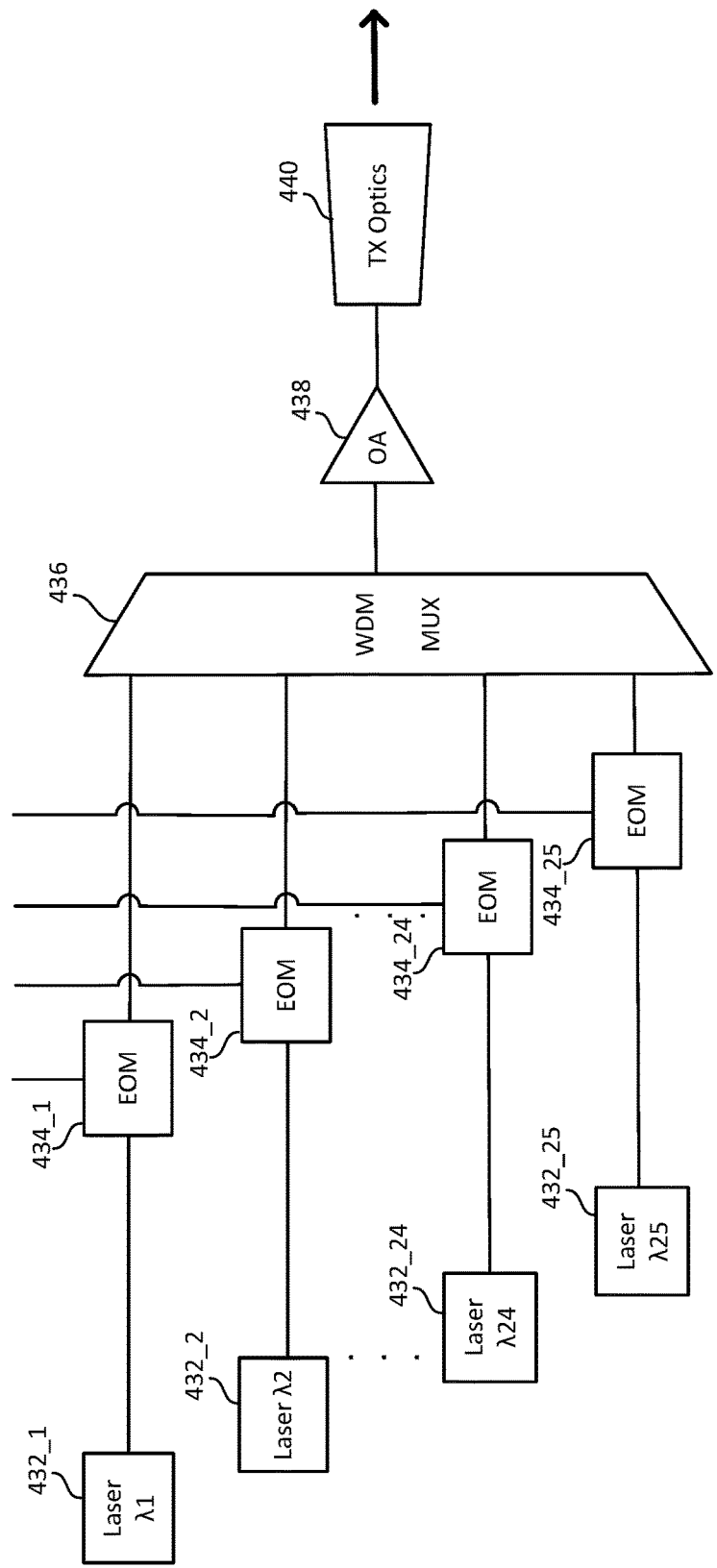
FIG. 4B depicts a further portion of space segment return link equipment, according to an embodiment of the present technology.
Figure 4C:
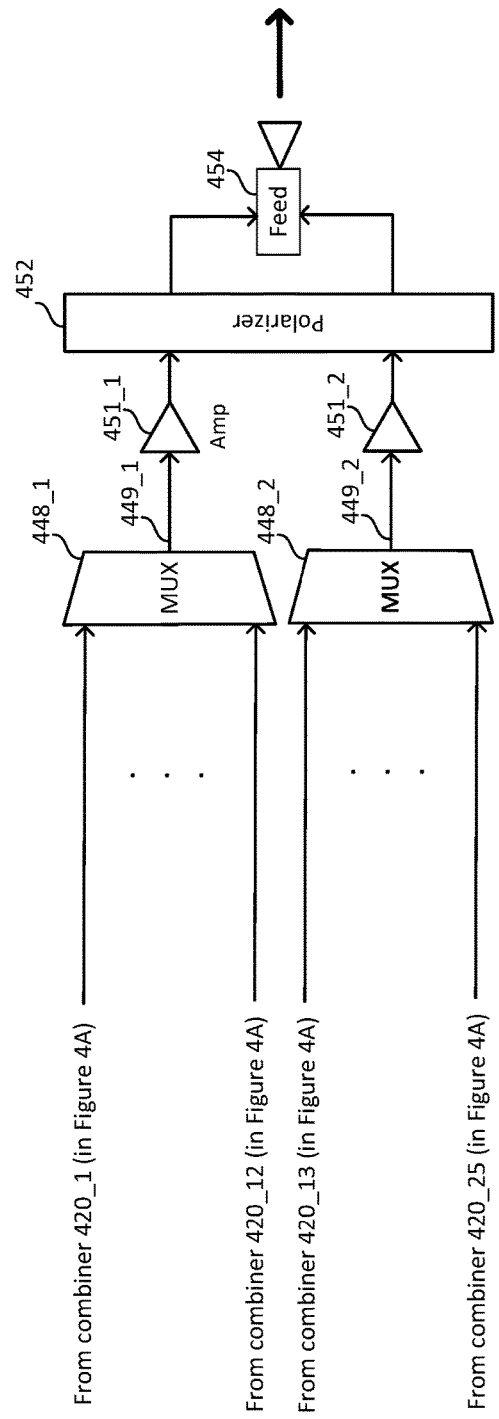
FIG. 4C depicts an alternative further portion of space segment return link equipment, according to an embodiment of the present technology, which can be used in place of the portion shown in FIG. 4B.
Figure 5A:
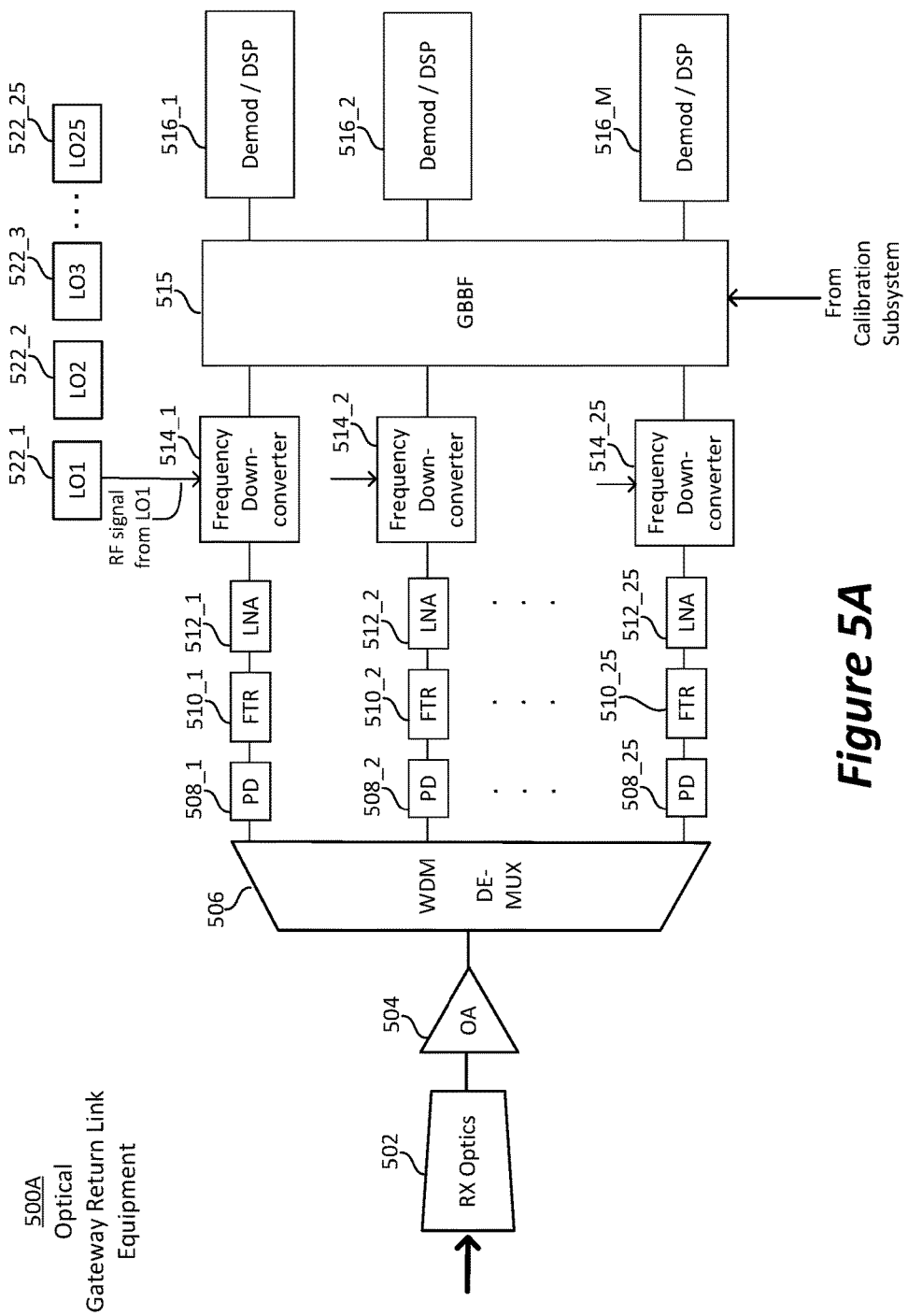
FIG. 5A depicts optical gateway return link equipment, according to an embodiment of the present technology.
Figure 5B:
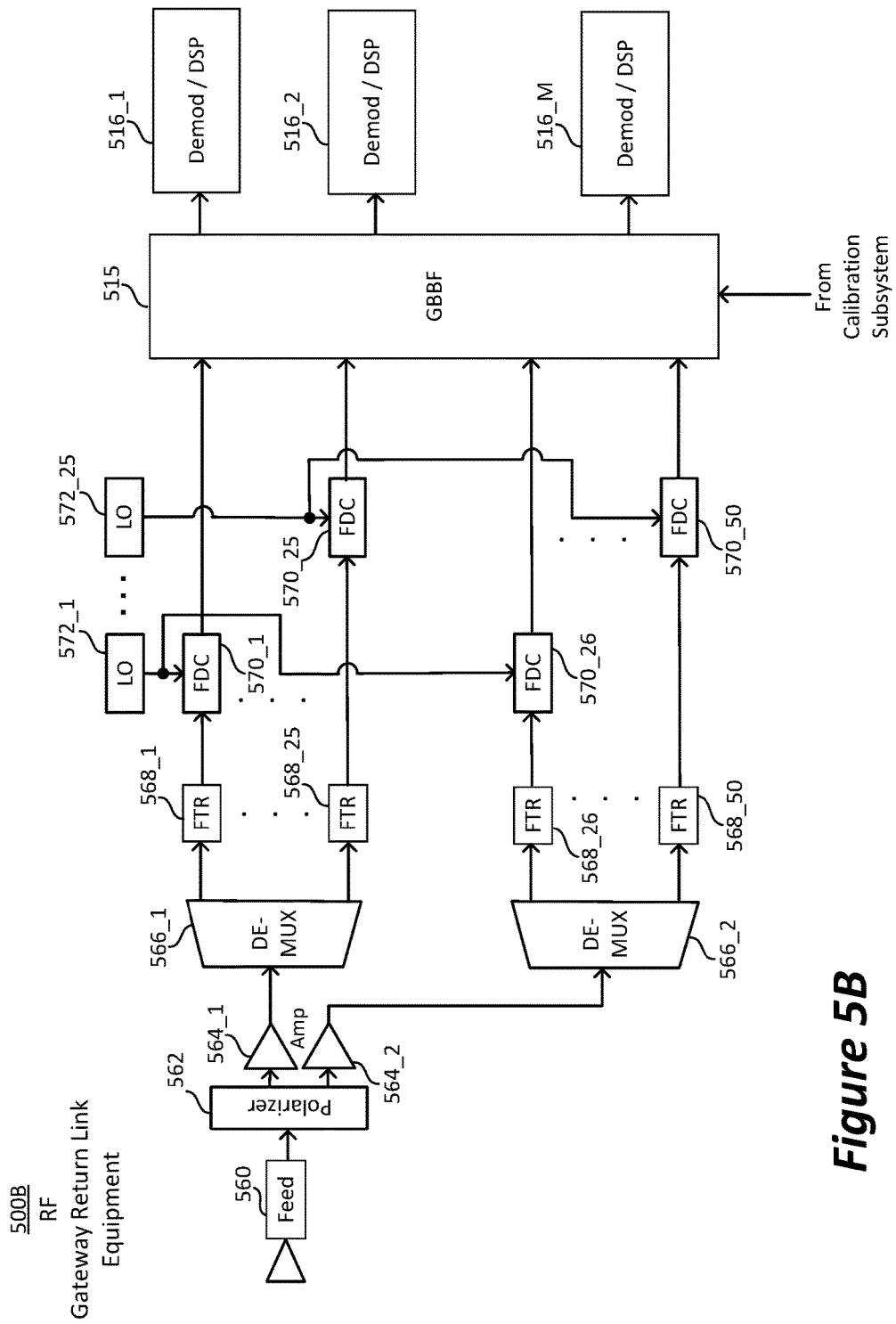
FIG. 5B depicts RF gateway return link equipment, according to an embodiment of the present technology.
Figure 5C:
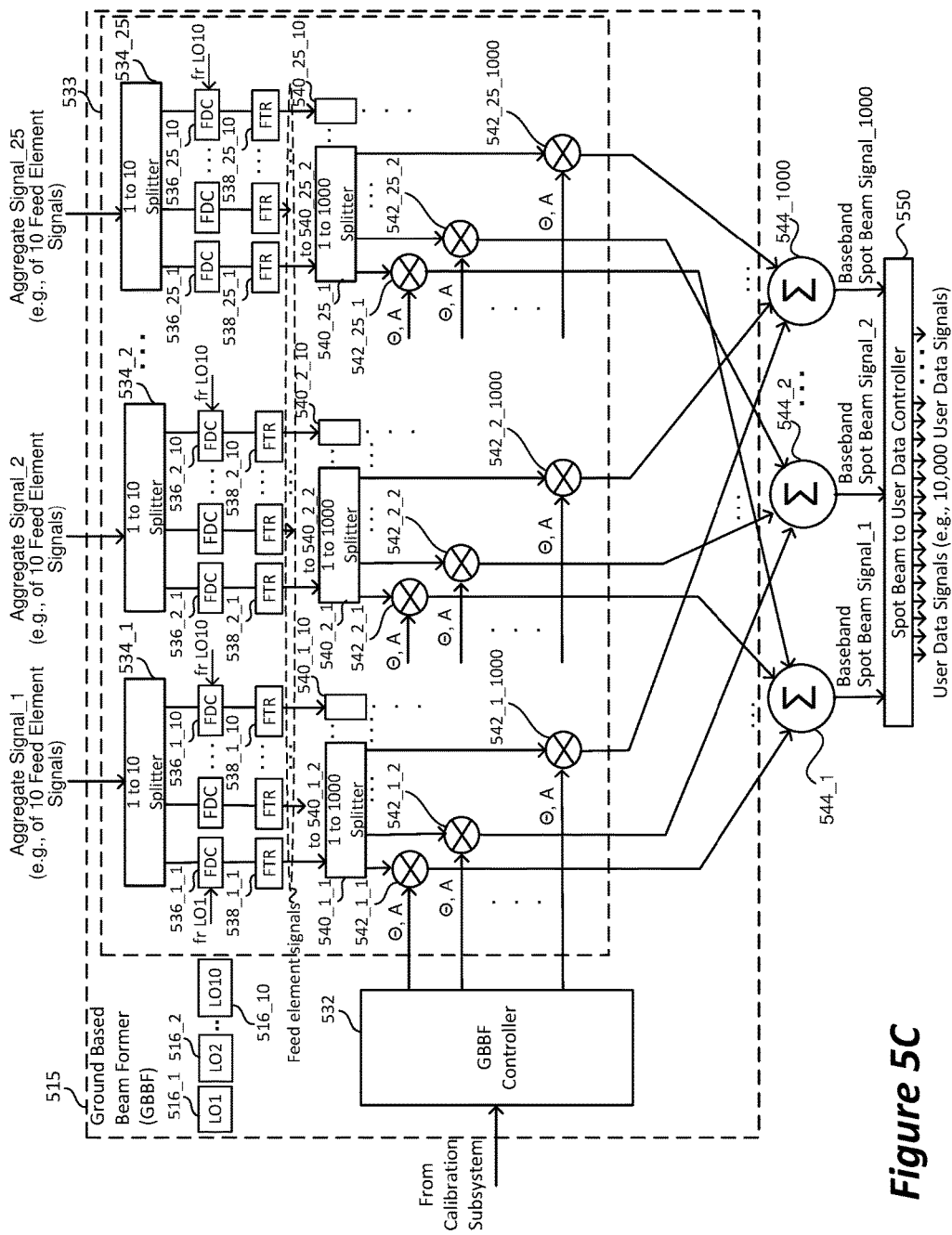
FIG. 5C depicts components of the ground based beamformer (GBBF) introduced in FIGS. 5A and 5B, according to an embodiment of the present technology.

FIGS. 2A, 2B and 2C will first be used to describe gateway forward link equipment according to certain embodiments of the present technology. FIGS. 3A and 3B will then be used to describe space segment forward link equipment and inter-satellite link (ISL) equipment according to certain embodiments of the present technology. FIGS. 4A, 4B and 4C will then be used to described space segment return link equipment according to certain embodiments of the present technology. FIGS. 5A, 5B and 5C will thereafter be used to describe gateway return link equipment according to certain embodiments of the present technology.

Optical Gateway Forward Link Equipment

FIG. 2A will now be used to describe gateway forward link equipment 200A, according to an embodiment of the present technology. Such gateway forward link equipment 200A can also be referred to as an optical gateway forward link subsystem 200A, or more generally, as an optical communication subsystem. Referring to FIG. 2A, the optical gateway forward link subsystem 200A is shown as including two hundred and fifty lasers 202_1 to 202_250, two hundred and fifty electro-optical modulator (EOMs) 204_1 to 204_250, a wavelength-division multiplexing (WDM) multiplexer (MUX) 206, an optical amplifier (OA) 208, and transmitter optics 210. The optical gateway forward link subsystem 200A is also shown as including a user data to spot beam controller 220 and a ground based beam former (GBBF) 230. The optical gateway forward link subsystem 200A is also shown as including two hundred and fifty local oscillators (LOs) 242_1 to 242_250, two hundred and fifty frequency up converters (FUCs) 244_1 to 244_250, and two hundred and fifty filters (FTRs) 246_1 to 246_250. Each of these elements is described below.

The user data to spot beam controller 220 is shown as receiving user data signals, e.g., 10,000 user data signals. An individual user data signal can be for forwarding to an individual service terminal ST, or multiple user data signals can be for simultaneously forwarding to an individual service terminal ST. In a broadcast scheme, an individual user data signal can be for forwarding to multiple service terminals ST simultaneously. Additional and/or alternative variations are also possible. These user data signals, as will be described below, are included within an optical feeder uplink beam (e.g., 102*u*) that is transmitted by the gateway forward link equipment 200A to a satellite (e.g., 100), and then the satellite could include the user data signals within spot beams (e.g., the RF service downlink beams 106*d*, 110*d*, 114*d* and 118*d* in FIG. 1) that are transmitted to service terminals ST. Assume, for example, that the satellite (e.g., 100 in FIG. 1) is configured to transmit one thousand spot beams using two hundred and fifty feed elements (e.g., feed elements 321_1 to 321_250 in FIG. 3A), and that the user data to spot beam controller 220 receives ten thousand user data signals. Continuing with this example, the user data to spot beam controller 220 would map the ten thousand user data signals to one thousand spot beam signals, which are provided to the GBBF 230. The one thousand spot beam signals that are provided to the GBBF 230, will, after they are included within an optical feeder uplink beam (e.g., 102*u*) that is transmitted by the gateway forward link equipment 200A to a satellite (e.g., 100), be used by the satellite (e.g., 100) to transmit one thousand spot beams that each cover a limited geographic region on Earth. More generally, the user data to spot beam controller 220 is configured to map, to each of a plurality of spot beam signals (e.g., to each of one thousand spot beam signals), a subset (e.g., ~ten) of the plurality of user data signal signals (e.g., ten thousand user data signals). The user data to spot beam controller 220, in accordance with certain embodiments, is performed digitally.

The GBBF 230, as will be described in additional detail with reference to FIG. 2C, receives the one thousand spot beam signals, and uses calibration information received from a calibration subsystem, to produce two hundred and fifty baseband feed element signals. The two hundred and fifty baseband feed element signals are provided to respective frequency up-converters (FUCs) 244_1 to 244_250, each of which also receives an RF carrier signal from a respective one of the local oscillators (LOs) 242_1 to 242_250. In other words, the local oscillators (LOs) 242_1 to 242_250, which can be referred to collectively as LOs 242, or individually as an LO 242, provide RF carrier signals to the FUCs 244, so that the FUCs 244 can frequency up-convert the feed element signals to a desired frequency range. In accordance with certain embodiments, in order to eliminate a need for RF frequency down-converters in the forward link equipment (e.g., 300 in FIG. 3) onboard the satellite, the carrier frequencies of the RF signals are used to up convert the feed element signals to the desired user downlink frequency band within the Ka band (or some other allotted band). As a result, the satellite repeater is greatly simplified. Still referring to FIG. 2A, the two hundred and fifty frequency up-converted feed elements signals (which can also be referred to more succinctly as feed element signals) are shown as being filtered by responsive FTRs 246_1 to 246_2, to filter out unwanted frequency components (e.g., unwanted mixed products) that result from the frequency up-conversions.

For an example, a portion of the Ka band that may be desirable to use for transmitting service downlink beams (also referred to as downlink user beams, or spot beams) from satellite 100 to service terminals ST can be from 17.7-20.2 GHz, and thus, includes a 2.5 GHz bandwidth. In such a case, each of the EOMs 204 could modulate the optical signal it receives (e.g., via an optical fiber from a respective laser 202) with a separate RF signal having a frequency within the range from 17.7-20.2 GHz. In other words, the FUCs 244 can be used to frequency up-convert baseband feed element signals to be within the frequency range from 17.7-20.2 GHz. Further, since each of the two hundred and fifty optical data signals (produced by the two hundred and fifty EOMs) has a bandwidth of 2.5 GHz, the bandwidth of the optical feeder uplink beam that is sent from the ground to the satellite is 625 GHz (i.e., 2.5 GHz*250=625 GHz). For another example, a portion of the Ka band that may be desirable to use for transmitting service downlink beams (also referred to as downlink user beams or spot beams) from satellite 100 to service terminals ST can be from 17.3-20.2 GHz, and thus, includes a 2.9 GHz bandwidth. In such a case, each of the EOMs 204 could modulate the optical signal it receives (e.g., via an optical fiber from a respective laser 202) with a separate RF signal having a frequency within the range from 17.3-20.2 GHz. In other words, the FUCs 244 can be used to frequency up-convert baseband feed element signals to be within the frequency range from 17.3-20.2 GHz. Further, since each of the two hundred and fifty optical data signals (produced by the two hundred and fifty EOMs) has a bandwidth of 2.9 GHz, the bandwidth of the optical feeder uplink beam that is sent from the ground to the satellite is 725 GHz (i.e., 2.9 GHz*250=725 GHz).

Still referring to FIG. 2A, each of the two hundred and fifty separate EOMs 204_1 to 204_250 is shown as receiving a respective one of the frequency up-converted feed element signals and a respective one of a plurality of optical carrier signals output by the two hundred and fifty lasers 202_1 to 202_250, which can be referred to individually as a laser 202, or collectively as the lasers 202. Explained another way, the light emitted by each of the two hundred and fifty lasers 202, which can be referred to as an optical carrier signal, is provided (e.g., via a respective optical fiber) to a respective one of the two hundred and fifty separate EOMs 204_1 to 204_250.

The two hundred and fifty separate lasers 202_1 to 202_250 each emit light of a different wavelength within a specified wavelength range that is for use in producing the optical feeder uplink beam (e.g., 102*u*). The lasers as noted above can be referred to individually as a laser 202, or collectively as the lasers 202. Where the specified wavelength range is, for example, from 1510 nanometers (nm) to 1560 nm, then the laser 202_1 may emit light having a peak wavelength of 1510 nm, the laser 202_2 may emit light having a peak wavelength of 1510.2 nm, the laser 202_3 (not shown) may emit light having a peak wavelength of 1510.4 nm, . . . the laser 202_249 (not shown) may emit light having a peak wavelength of 1559.8 nm, and the laser 202_250 may emit light having a peak wavelength of 1560 nm. In other words, the peak wavelengths emitted by the lasers 202 can occur at 0.2 nm intervals from 1510 nm to 1560 nm. The wavelength range from 1510 nm to 1560 nm, which is within the infrared (IR) spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder uplink beam (e.g., 102*u*) is non-contiguous. For example, the wavelength range that is for use in producing the optical feeder uplink beam can be from 1510 nm to 1534.8 nm and from 1540.2 nm to 1564.8 nm. Further, it is also possible that gateway forward link equipment can alternatively include more or less than two hundred and fifty lasers (that each emit light of a different peak wavelength within a specified contiguous or non-contiguous wavelength range). Additionally, it is noted that the gateway forward link equipment may include two or more of each of the lasers (that each emit light of a different peak wavelength within a specified contiguous or non-contiguous wavelength range) to provide for redundancy or backup. Each of the lasers 202 can be, for example, a diode-pumped infrared neodymium laser, although the use of other types of lasers are also within the scope of the embodiments described herein.

To reduce and preferably avoid interference, the wavelength range that is for use in producing the optical feeder uplink beam (e.g., 102*u*) should be different than the wavelength range that is for use in producing the optical feeder downlink beam (e.g., 102*d*). For example, if the wavelength range that is for use in producing the optical feeder uplink beam 102*u* is from 1510 nm to 1560 nm, then the wavelength range that is for use in producing the optical feeder downlink beam 102*d* can be from 1560.2 nm to 1575 nm. For another example, if the wavelength range that is for use in producing the optical feeder uplink beam 102*u* is from 1510 nm to 1534.8 nm and from 1540.2 nm to 1564.8 nm, then the wavelength range that is for use in producing the optical feeder downlink beam 102*d* can be from 1535 nm to 1540 nm and from 1565 nm to 1575 nm. These are just a few examples, which are not intended to be all encompassing. Details of how an optical feeder downlink beam (e.g., 102*d*) can be produced in accordance with an embodiment of the present technology are provided below in the discussion of FIGS. 4A and 4B.

Still referring to FIG. 2A, the light emitted by each of the two hundred and fifty lasers 202, which can be referred to as an optical carrier signal, is provided (e.g., via a respective optical fiber) to a respective one of the two hundred and fifty separate EOMs 204_1 to 204_250. Each of the EOMs is an optical device in which a signal-controlled element exhibiting an electro-optic effect is used to modulate a respective beam of light. The modulation performed by the EOMs 204 may be imposed on the phase, frequency, amplitude, or polarization of a beam of light, or any combination thereof. In accordance with a specific embodiment, each of the EOMs 204 is a phase modulating EOM that is used as an amplitude modulator by using a Mach-Zehnder interferometer. In other words, each of the EOMs 204 can be implemented as a Mach-Zehnder modulator (MZM), which can be a Lithium Niobate Mach-Zehnder modulator, but is not limited thereto. In accordance with specific embodiments, each of the EOMs 204 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 204 can be referred to as an optical frequency up-converted feed element signal, or more succinctly as an optical feed element signal. The modulation scheme that is implemented by the EOMs 204 can result in double- or vestigial-sidebands, including both an upper sideband (USB) and a lower sideband (LSB). Alternatively single-sideband modulation (SSB) can be utilized to increase bandwidth and transmission power efficiency.

The two hundred and fifty separate optical feed element signals that are output by the two hundred and fifty EOMs 204 are provided to the WDM MUX 206, which can also be referred to as a dense wavelength division multiplexing (DWDM) MUX. The WMD MUX 206 multiplexes (i.e., combines) the two hundred and fifty optical feed element signals, received from the two hundred and fifty EOMs 204, onto a single optical fiber, with each of the two hundred and fifty separate optical feed element signals being carried at the same time on its own separate optical wavelength within the range from 1510 nm to 1560 nm (or some other contiguous or non-contiguous wavelength range). For example, as explained above, the two hundred and fifty separate optical feed element signals can have peak wavelengths of 1510 nm, 1510.2 nm, 1510.4 nm . . . 1559.8 nm and 1560 nm.

The signal that is output by the WMD MUX 206, which can be referred to as a wavelength division multiplexed optical signal, is provided to the optical amplifier (OA) 208. The OA 208 amplifies the wavelength division multiplexed optical signal so that the wavelength division multiplexed optical signal has sufficient power to enable transmission thereof from the ground to the satellite 100 in space. An exemplary type of OA 208 that can be used is an erbium-doped fiber amplifier (EDFA). However embodiments of the present technology are not limited to use with an EDFA. The output of the OA 208 can be referred to as an optically amplified wavelength division multiplexed optical signal.

The optically amplified wavelength division multiplexed optical signal, which is output by the OA 208, is provided (e.g., via an optical fiber) to the transmitter optics 210. The transmitter optics 210, which can also be referred to as a telescope, can includes optical elements such as lenses, mirrors, reflectors, filters and/or the like. The transmitter optics 210 outputs a collimated optical feeder uplink beam that is aimed at a satellite. A gimbal, and/or the like, can be used to control the steering of the transmitter optics 210. In accordance with an embodiment, the collimated optical feeder uplink beam has an aperture of about 100 cm, and a half beam divergence of about 0.0000004 radians, wherein the term "about" as used herein means+/−10 percent of a specified value. The use of other apertures and half beam divergence values are also within the scope of the embodiments described herein. The collimated optical feeder uplink beam, which is output by the transmitter optics 210, is transmitted in free-space to receiver optics on a satellite. The term "free-space" means air, outer space, vacuum, or something similar (which is in contrast to using solids such as optical fiber cable, an optical waveguide or an optical transmission line). Reception and processing of the optical feeder uplink beam received at the satellite will be described in additional detail below. However, before describing the reception and processing of the optical feeder uplink beam received at the satellite, additional details of the gateway forward link equipment, according to certain embodiments of the present technology, will first be provided.

In order to wavelength division multiplex two hundred and fifty wavelengths produced by the two hundred and fifty lasers 202_1 to 202_250, a combination of C band optical frequencies (from 1530 nm to 1565 nm) and L band optical frequencies (from 1565 nm to 1625 nm) may be used, in order to keep the separation of the wavelengths to be at least 20-25 GHz in order to reduce and preferably minimize inter-wavelength interference that may occur in an optical fiber due to non-linearities. If fewer wavelengths are used (e.g., at C band alone), and higher bandwidth is available at Ka band per user beam (e.g., if 2.9 GHz is available as it is in certain ITU Regions), the overall throughput still remains of the order of several hundred GHz, which lets the capacity reach the Tb/s range. If instead each wavelength carries more than the Ka band user bandwidth, fewer wavelengths can be used, but some amount of frequency conversion may be needed in the space segment forward link equipment.

A technology that is increasingly being deployed for use with satellite communication is ground based beamforming, where a feederlink is segmented into smaller frequency bands and routed to different feeds that then form beams as needed using ground based beamforming in a dynamic manner, which allows flexibility to meet changing and evolving traffic demands. However, at high frequencies (such as Ku band or Ka band) ground based beamforming typically requires a large number of feeds to form good quality beams and the per-feed bandwidth multiplied by the number of feeds gets too large for any RF spectrum to handle. For this reason, ground based beamforming has been limited to mobile-satellite service (MSS) systems where per-beam bandwidth is limited and the number of feed elements is also small.

Certain embodiments of the present technology, including, e.g., those described with reference to FIG. 2A, use analog over free space optics (AoFSO) technology to generate the feeder links from a gateway to/from a satellite, thereby using optical signals to replace the normal Ku or Ka or V band RF spectrum. By modulating these optical wavelengths at the desired RF frequencies, it is possible to use ground based beamforming, even at high frequencies like Ka band, and with large numbers of feed elements, due to the high RF bandwidth available at optical frequencies.

In accordance with certain embodiments, in order to eliminate a need for RF frequency down-converters in the forward link equipment (e.g., 300A in FIG. 3A) onboard the satellite, the carrier frequencies of the RF signals are used to up convert the feed element signals to the desired user downlink frequency band within the Ka band (or some other allotted band). As a result, the satellite repeater is greatly simplified. For an example, a portion of the Ka band that may be desirable to use for transmitting service downlink beams (also referred to as downlink user beams, or spot beams) from satellite 100 to service terminals ST can be from 17.7-20.2 GHz, and thus, includes a 2.5 GHz bandwidth. In such a case, each of the EOMs 204 could modulate the optical signal it receives (e.g., via an optical fiber from a respective laser 202) with a separate RF signal having a frequency within the range from 17.7-20.2 GHz. In other words, the FUCs 244 can be used to frequency up-convert baseband feed element signals to be within the frequency range from 17.7-20.2 GHz. Further, since each of the two hundred and fifty optical data signals (produced by the two hundred and fifty EOMs) has a bandwidth of 2.5 GHz, the bandwidth of the optical feeder uplink beam that is sent from the ground to the satellite is 625 GHz (i.e., 2.5 GHz*250=625 GHz). For another example, a portion of the Ka band that may be desirable to use for transmitting service downlink beams (also referred to as downlink user beams or spot beams) from satellite 100 to service terminals ST can be from 17.3-20.2 GHz, and thus, includes a 2.9 GHz bandwidth. In such a case, each of the EOMs 204 could modulate the optical signal it receives (e.g., via an optical fiber from a respective laser 202) with a separate RF signal having a frequency within the range from 17.3-20.2 GHz. In other words, the FUCs 244 can be used to frequency up-convert baseband feed element signals to be within the frequency range from 17.3-20.2 GHz. Further, since each of the two hundred and fifty optical data signals (produced by the two hundred and fifty EOMs) has a bandwidth of 2.9 GHz, the bandwidth of the optical feeder uplink beam that is sent from the ground to the satellite is 725 GHz (i.e., 2.9 GHz*250=725 GHz).

Beneficially, with ground based beamforming, spot beams can be added, removed or reconfigured within a gateway to enable a satellite to operate from different orbital locations and to adapt to changes in traffic patterns or to new applications.

Instead of analog over free space optics (AoFSO) technology being used generate the feeder links from a gateway to/from a satellite using transmit and receive optics, the feeder links that are generated using GBBF can instead be RF signals that are transmitted and received using antennas, as will be described below, e.g., with reference to FIG. 2B.

RF Gateway Forward Link Equipment

FIG. 2B will now be used to describe gateway forward link equipment 200B, according to another embodiment of the present technology, wherein gateway forward link equipment 200B generates and transmits an RF feeder uplink beam to a satellite (as opposed to an optical feeder uplink beam, as was the case in the embodiment of FIG. 2A). Such gateway forward link equipment 200B can also be referred to as an RF gateway forward link subsystem 200B, or more generally, as an RF communication subsystem. Components in FIG. 2B that are the same or similar to those shown in FIG. 2A are labeled the same in FIG. 2B as they were in FIG. 2A.

Referring to FIG. 2B, the RF gateway forward link subsystem 200B is shown as including a user data to spot beam controller 220, a ground based beam former (GBBF) 230, one hundred and twenty five local oscillators (LOs) 242_1 to 242_125, two hundred and fifty frequency up converters (FUCs) 244_1 to 244_250, and two hundred and fifty filters (FTRs) 246_1 to 246_250. The gateway forward link subsystem 201 is also shown as including two multiplexers 348_1 and 248_2, two amplifiers 251_1 and 251_2, a polarizer 252, and a feed horn 254.

As was the case in the embodiment of FIG. 2A, the user data to spot beam controller 220 is shown as receiving user data signals, e.g., 10,000 user data signals. An individual user data signal can be for forwarding to an individual service terminal ST, or multiple user data signals can be for simultaneously forwarding to an individual service terminal ST. In a broadcast scheme, an individual user data signal can be for forwarding to multiple service terminals ST simultaneously. Additional and/or alternative variations are also possible. These user data signals, as will be described below, can be included within an RF feeder uplink beam (e.g., 102*u*) that is transmitted by the gateway forward link equipment 200B to a satellite (e.g., 100), and then the satellite could include the user data signals within spot beams (e.g., the RF service downlink beams 106*d*, 110*d*, 114*d* and 118*d* in FIG. 1) that are transmitted to service terminals ST. Assume, for example, that the satellite (e.g., 100 in FIG. 1) is configured to transmit one thousand spot beams using two hundred and fifty feed elements (e.g., feed elements 326_1 to 326_250 in FIG. 3A), and that the user data to spot beam controller 220 receives ten thousand user data signals. Continuing with this example, the user data to spot beam controller 220 would map the ten thousand user data signals to one thousand spot beam signals, which are provided to the GBBF 230. The one thousand spot beam signals that are provided to the GBBF 230, will, after they are included within an RF feeder uplink beam (e.g., 102*u*) that is transmitted by the gateway forward link equipment 200B to a satellite (e.g., 100), be used by the satellite (e.g., 100) to transmit one thousand spot beams that each cover a limited geographic region on Earth. More generally, the user data to spot beam controller 220 is configured to map, to each of a plurality of spot beam signals (e.g., to each of one thousand spot beam signals), a subset (e.g., ~ten) of the plurality of user data signal signals (e.g., ten thousand user data signals). The user data to spot beam controller 220, in accordance with certain embodiments, is performed digitally.

The GBBF 230, as will be described in additional detail with reference to FIG. 2C, receives the one thousand spot beam signals, and uses calibration information received from a calibration subsystem, to produce two hundred and fifty baseband feed element signals. The two hundred and fifty baseband feed element signals are provided to respective frequency up-converters (FUCs) 244_1 to 244_250, each of which also receives an RF carrier signal from a respective one of the local oscillators (LOs) 242_1 to 242_125. In other words, the local oscillators (LOs) 242_1 to 242_150, which can be referred to collectively as LOs 242, or individually as an LO 242, provide RF carrier signals to the FUCs 244, so that the FUCs 244 can frequency up-convert the feed element signals to a desired frequency range.

In accordance with certain embodiments, in order to eliminate a need for RF frequency down-converters in the forward link equipment (e.g., 300B in FIG. 3B) onboard the satellite, the carrier frequencies of the RF signals are used to up convert the feed element signals to the desired user downlink frequency band within the Ka band (or some other allotted band). As a result, the satellite repeater is greatly simplified. For an example, a portion of the Ka band that may be desirable to use for transmitting service downlink beams (also referred to as downlink user beams, or spot beams) from satellite 100 to service terminals ST can be from 17.7-20.2 GHz, and thus, includes a 2.5 GHz bandwidth. For another example, a portion of the Ka band that may be desirable to use for transmitting service downlink beams (also referred to as downlink user beams or spot beams) from satellite 100 to service terminals ST can be from 17.3-20.2 GHz, and thus, includes a 2.9 GHz bandwidth. In other words, the FUCs 244 can be used to frequency up-convert baseband feed element signals to be within the frequency range within the Ka band.

Still referring to FIG. 2B, the two hundred and fifty frequency up-converted feed elements signals (which can also be referred to more succinctly as feed element signals) are shown as being filtered by responsive FTRs 246_1 to 246_250, to filter out unwanted frequency components (e.g., unwanted mixed products) that result from the frequency up-conversions.

Still referring to FIG. 2B, one hundred and twenty of the five frequency up-converted and filtered baseband feed element signals (upconverted by the FUCs 244_1 to 244_125 and filtered by one hundred and twenty five filters 246_1 to 246_125) are provided to the multiplexer 248_1, which frequency divisional multiplexes the one hundred and twenty five frequency up-converted and filtered baseband feed element signals into a first multiplexed signal 249_1 that is amplified by the amplifier 251_1 and then provided to the polarizer 250. The other one hundred and twenty five frequency up-converted and filtered baseband feed element signals (upconverted by the FUCs 244_126 to 244_250 and filtered by one hundred and twenty five filters 246_126 to 246_250) are provided to the multiplexer 248_2, which frequency divisional multiplexes the one hundred and twenty five frequency up-converted and filtered baseband feed element signals into a second multiplexed signal 249_2 that is amplified by the amplifier 252_1 and then provided to the polarizer 252.

The polarizer 252 receives the first and second multiplexed signals 249_1 and 249_2, after they are amplified by respective amplifiers 251_1 and 252_2, and the polarizer 252 applies orthogonal polarizations to the two signals so that they can be combined into one signal by the feed horn 254. For example, one polarization can be horizontal while the other is vertical, or one polarization can be right hand circular with the other is left hand circular. These are just a few examples of the orthogonal types of polarizations, which are not intended to be an exhaustive list. The amplifiers 251_1 and 251_2 amplify the multiplexed signals 249_1 and 249_2 output from the multiplexers 248_1 and 248_2 so that the RF signal to be transmitted has sufficient power to enable transmission thereof from the ground to the satellite 100 in space.

To reduce and preferably avoid interference, the frequency range that is for use in producing the RF feeder uplink beam (e.g., 102u) should be different than the frequency range that is for use in producing the RF feeder downlink beam (e.g., 102d). For example, if the frequency range that is for use in producing the RF feeder uplink beam 102u is 29.0-30 GHz, then the frequency range that is for use in producing the RF feeder downlink beam 102d can be from 17.7-20.2 GHz. For another example, if the frequency range that is for use in producing the RF feeder uplink beam 102u is 30-31 GHz, then the frequency range that is for use in producing the RF feeder downlink beam 102d can be from 20.2-21.2 GHz. These are just a few examples, which are not intended to be all encompassing. Details of how an RF feeder downlink beam (e.g., 102d) can be produced in accordance with an embodiment of the present technology are provided below in the discussion of FIGS. 4C and 4D. Other examples would be to use V band (47.2-50.2 GHz and 50.4-51.4 GHz) frequencies for the gateway uplinks and Q band (37.5-42.5 GHz) for the gateway downlinks.

Ground Based Beamformer (GBBF)

FIG. 2C will now be used to provided details of the GBBF 230 introduced in FIG. 2A, and also shown in FIG. 2B, according to certain embodiments of the present technology. Referring to FIG. 2C, the GBBF 230 is shown as including a GBBF controller 232 and one thousand 1 to N splitters 234_1 to 234_1000, where N can equal, e.g., two hundred and fifty, but is not limited thereto. Each individual splitter 234_1 to 234_1000 (which can be referred to collectively as the splitters 234, or individually as a splitter 234) outputs N copies of the spot beam signal received by the splitter 234. For example, the splitter 234_1, which receives the spot beam signal_1, outputs N copies of the spot beam signal_1.

The N outputs of each of the splitters 234, are provided to respective phase and amplitude weight elements 236, which can be implemented in hardware, but are more likely implemented in software and/or firmware. In accordance with certain embodiments, the function of the splitters 234 is performed using a digital signal processor (DSP) instead of N separate splitters. In other words, a DSP can perform the signal copying or replication. An output of each of the phase and amplitude weight elements 236 is provided to one of the two hundred and fifty summers 238_1 to 238_250. The outputs of the summers 238_1 to 238_250 are the baseband feed element signals that are frequency up-converted by the FUCs 244 in FIG. 2A or FIG. 2B. The GBBF 230 can be implemented entirely in software. Alternatively, or additionally, the GBBF 230 can be implemented in hardware and/or firmware. The outputs of the phase and amplitude weight elements 236 can be referred to as component element signals. The outputs of the summers 238, which outputs are referred to as the baseband feed element signals above, can also be referred to as composite signals, since they are a composite of a plurality of component element signals. In the manner described above with reference to FIG. 2A, these composite signals are frequency up-converted, filtered, electro-optically modulated, WDM multiplexed, amplified and optically transmitted to a satellite. Alternatively, in the manner described above with reference to FIG. 2B, these composite signals are frequency up-converted, filtered, filtered, multiplexed, amplified, polarized, and RF transmitted to a satellite.

The splitters 234 and the weight elements 236 can be collectively referred to as a signal replication and forward beamforming weighting unit 233. Assuming there are one thousand spot beam signals provided to the signal replication and forward beamforming weighting unit 233, and two hundred and fifty feed elements on a satellite (to which the gateway forward link equipment 200 is transmitting a feeder uplink beam, e.g., 102u), then the GBBF controller 232 uses calibration signals (received from a calibration subsystem) to derive element specific amplitude and phase corrections that are applied individually to two hundred and fifty thousand component element signals (i.e., one thousand spot beam signals*two hundred and fifty feed elements=two hundred and fifty thousand component element signals). As noted above, a DSP can perform the signal copying or replication performed by the splitters 234. More generally, all of the functions of the elements described within the block labeled GBBF 230 can be implemented by a DSP. In other words, the GBBF 230 can be entirely or substantially entirely implemented using a DSP. Nevertheless, it is useful to shown and describe the elements shown in FIG. 2C in order to understand the operation of such a DSP.

The calibration subsystem from which the GBBF controller 232 receives calibration signals can transmit and/or receive calibration signals upon which calibration measurements can be performed. These forward and return link measurements can be generally referred to as a beamforming calibration process, and can be used to initialize, update and refine the performance of RF service downlink beams (e.g., 106d, 110d, 114d and 118d in FIG. 1) and RF service uplink beams (e.g., 106u, 110u, 114u, 118u in FIG. 1). The calibration and pointing stations 170 in FIG. 1 can be part of such a calibration subsystem. To form a specific beam, the amplitude and phase weightings should be set to the appropriate values for each feed element, and should be effectively applied at the feed element apertures. For example, take two feed elements and assume a desired beam is formed with an amplitude of A1 and a phase of θ1 degrees for feed element one and an amplitude of A2 and a phase of θ2 degrees for feed element two. In typical on board beamforming the beam forming operation is very close to the feed aperture, so it is much simpler to set these values correctly. However, with ground based beamforming, the signals traverse down independent paths, through the propagation media at different frequencies which may have differing amplitude and phase channels, and then through independent conversion paths. One of the paths may experience more amplitude attenuation and phase shift than the other. Without knowledge and compensation of this difference, the beam forming weights at the aperture will not be the desired values. Depending on the error experienced, the desired beam may be mispointed, misshaped, or even dispersed so grossly as to not be recognizable as a spot beam. However, if the value of the amplitude and phase difference between the element paths between the feed element aperture and the ground based beamforming operation is known, it is relatively simply to be compensated for by adjusting the feed coefficient weights or compensating for the shift before applying the feed weights. Consequently, in order for the GBBF 230 to function properly a calibration scheme can be used by a calibration subsystem to determine and compensate for the amplitude and phase variations between the feed element paths. Examples of such calibration subsystems and schemes for use with ground based beamforming are described in U.S. Pat. No. 7,787,819 to Walker et al., entitled "Ground-Based Beamforming for Satellite Communications Systems" and in an article entitled "Architecture, Implementation and Performance of Ground-Based Beam Forming in the DBSD G1 Mobile Satellite System" by Walker et al. (28th AIAA International Communications Satellite Systems Conference (ICSSC-2010)), each of which is incorporated herein by reference. Other types of calibration subsystem can alternatively be used.

Space Segment Forward Link and Forward Inter-Satellite Link Equipment

FIG. 3A will now be used to describe space segment forward link equipment 300A and optical-to-optical space segment forward inter-satellite link (ISL) equipment 301A, which can be used with the optical gateway forward link equipment 200A discussed above with reference to FIG. 2A.

The space segment forward ISL equipment 301A, which can also be referred to as a satellite forward ISL subsystem 301A, or more generally, as an optical communication subsystem, can be configured to receive an optical feeder uplink beam that is transmitted from the ground based optical gateway subsystem 200A (in FIG. 2A) to the satellite (e.g., 100) that is carrying the space segment forward ISL equipment 301A. Alternatively, or additionally, the space segment forward ISL equipment 301A can be configured to receive an optical ISL beam that is transmitted from another satellite (e.g., 150). The space segment forward ISL equipment 301A can also configured to act as an optical repeater to pass on an optical beam (or a portion thereof) that it receives (from the ground based optical gateway subsystem 200A, or from another satellite) to a further satellite (e.g., 160) as an optical ISL beam. Both the space segment forward link equipment 300A, and the space segment forward ISL equipment 301A, can be included on a same satellite (e.g., 100). This can enable the satellite (e.g., 100) to send some data that it receives (e.g., from the gateway 105) to some service terminals STs that are within a region (e.g., 108) that is illuminated by a service downlink beam (e.g., 106d) of the satellite, and send other data that it receives (from the same gateway 105) to another satellite (e.g., 150) so that the other satellite can send the other data to other service terminal STs that are within another region that is illuminated by a service downlink beam of the other satellite. In such an embodiment, the space segment forward ISL equipment 301A can share certain elements with the space segment forward link equipment 300A, as will be appreciated from FIG. 3A, and the description thereof.

Referring to FIG. 3A, the space segment forward ISL equipment 300A is shown as including receiver optics 302, an optical amplifier (OA) 304, a wavelength-division multiplexing (WDM) demultiplexer (DEMUX) 306, two hundred and fifty optical filters (FTR) 334_1 to 334_250, a wavelength-division multiplexing (WDM) multiplexer (MUX) 336, an optical amplifier (OA) 338, and transmitter optics 340.

The receiver optics 302 (which can include optical elements such as mirrors, reflectors, filters and/or the like) can receive an optical feeder uplink beam (e.g., 102u) that is transmitted through free-space to the satellite by the ground based optical gateway forward link subsystem 200A, and provides the received optical feeder uplink beam (e.g., via an optical fiber) to the OA 304. A gimbal, and/or the like, can be used to control the steering of the receiver optics 302. When the optical feeder uplink beam reaches the satellite, the power of the optical feeder uplink beam is significantly attenuated compared to when it was transmitted by the ground based optical gateway subsystem (e.g., 200A). Accordingly, the OA 304 is used to amplify the received optical feeder uplink beam before it is provided to the WDM DEMUX 306. The OA 304 can be, e.g., an erbium-doped fiber amplifier (EDFA), but is not limited thereto. The output of the OA 304 can be referred to as an optically amplified received optical feeder uplink signal.

The same receiver optics 302, or another instance of the receiver optics, can receive an optical ISL beam that is transmitted by another satellite (e.g., 150) through free-space to the satellite (e.g., 100), and provides the received optical ISL beam (e.g., via an optical fiber) to the OA 304, or another instance of the OA. When an optical ISL beam that originated from another satellite reaches the satellite, the power of the optical ISL beam is significantly attenuated compared to when it was transmitted by the other satellite. Accordingly, the OA 304 can be used to amplify the received optical ISL beam before it is provided to the WDM DEMUX 306. In this case, the output of the OA 304 can be referred to as an optically amplified received optical ISL signal.

The WDM DEMUX 306 demultiplexes (i.e., separates) the received optical feeder uplink beam (or the received optical ISL beam), after it has been optically amplified, into two hundred and fifty separate optical data signals, each of which has a different peak optical wavelength. In accordance with an embodiment, a first subset of the two hundred and fifty separate optical data signals (each of which has a different peak optical wavelength) is used to produce an optical ISL beam that is transmitted to another satellite, and a second subset of the two hundred and fifty separate optical data signals (each of which has a different peak optical wavelength) is used to produce RF service downlink beams. For example, one hundred and twenty five optical data signals output by the WDM DE-MUX 306, after being optionally filtered by the optional filters 334_1 to 334_125, are provided to the WDM MUX 336. The other one hundred and twenty five optical data signals that are output by the WDM DEMUX 306 are shown as being provided to the space segment forward link equipment 300A, which is discussed in more detail below. More generally, a first subset of the optical data signals that are output by the WDM DEMUX 306 are used by the space based forward ISL equipment to produce an optical ISL beam that is transmitted to another satellite, and a second subset of the optical data signals that are output by the WDM DEMUX 306 are provided to the space segment forward link equipment 300A and used thereby to produce RF service downlink beams (e.g., 106d, 110d, 114d and 118d in FIG. 1) that are transmitted to service terminals ST, as will be described in additional detail below. The specific optical data signals (output by the WDM DE-MUX 306) that are included in the first subset (used to produce the optical ISL beam that is transmitted to another satellite, and the specific optical data signals (output by the WDM DE-MUX 306) that are included in the second subset (used to produce the RF service downlink beams that are transmitted to service terminals ST), can be predetermined and unchangeable on the satellite. Alternatively, the space segment equipment can include an optional optical cross-connect 307 (shown in dashed line in FIG. 3A) that can be controlled to dynamically change within the satellite which optical data signals (output by the WDM DE-MUX 306) are included in the first subset (used to produce the optical ISL beam that is transmitted to another satellite), and which optical data signals (output by the WDM DE-MUX 306) are included in the second subset (used to produce the RF service downlink beams that are transmitted to service terminals ST). Such an optical cross-connect 307 can be controlled by a ground based gateway, e.g., 105, but is not limited thereto. It is also possible that the first and second subsets of optical data signals differ in the number of signals included in each subset.

Still referring to FIG. 3A, the one hundred and twenty five optical data signals that are provided to the WDM MUX 336 (which signals, as noted above, may or may not first be filtered by a respective one of the filters 334) are multiplexed (i.e., combined) by the WDM MUX 336 onto a same optical fiber, with each of the one hundred and twenty five optical data signals being carried at the same time on its own separate optical wavelength within a specified contiguous wavelength range (e.g., from 1510 nm to 1560 nm) or a specified non-contiguous wavelength range (e.g., from 1510 nm to 1534.8 nm and from 1540.2 nm to 1564.8 nm). However, wider or narrow wavelength ranges, within the infrared or other parts of the optical spectrum, may alternatively be used. For example, it would also be possible to utilize a contiguous or non-contiguous wavelength range within the 400 nm-700 nm visible spectrum.

The OA 338 amplifies the wavelength division multiplexed optical signal so that the wavelength division multiplexed optical signal has sufficient power to enable transmission thereof from the satellite (e.g., 100) in free-space to another satellite (e.g., 150). The OA 338 can be an erbium-doped fiber amplifier (EDFA), but is not limited thereto. The output of the OA 338 can be referred to as an optically amplified wavelength division multiplexed optical ISL signal.

The optically amplified wavelength division multiplexed optical ISL signal, which is output by the OA 338, is provided (e.g., via an optical fiber) to the transmitter optics 340. The transmitter optics 340, which can also be referred to as a telescope, can includes optical elements such as lenses, mirrors, reflectors, filters and/or the like. The transmitter optics 340 outputs a collimated optical ISL beam that is aimed at another satellite. A gimbal, and/or the like, can be used to control the steering of the transmitter optics 340. In accordance with an embodiment, the collimated optical ISL beam has an aperture of about 40 cm, and a half beam divergence of about 0.0000012 radians, wherein the term "about" as used herein means+/−10 percent of a specified value. The use of other apertures and half beam divergence values are also within the scope of the embodiments described herein. The collimated optical ISL beam, which is output by the transmitter optics 340, is transmitted in free-space to receiver optics of another satellite.

Still referring to FIG. 3A, one hundred and twenty five optical data signals that are output by the WDM DEMUX 306 are shown as being provided to one hundred and twenty five photodetectors (PDs) 308_1 to 308_125, which are part of the space segment forward link equipment 300A. The specific optical data signals (output by the WDM DE-MUX 306) that are included in the first subset (used to produce the optical ISL beam that is transmitted to another satellite, and the specific optical data signals (output by the WDM DE-MUX 306) that are included in the second subset (used to produce the RF service downlink beams that are transmitted to service terminals ST), can be predetermined and unchangeable on the satellite. Alternatively, the optional optical cross-connect 307 (shown in dashed line in FIG. 3A) can be controlled to dynamically change within the satellite which optical data signals (output by the WDM DE-MUX 306) are included in the first subset (used to produce the optical ISL beam that is transmitted to another satellite, and which optical data signals (output by the WDM DE-MUX 306) are included in the second subset (used to produce the RF service downlink beams that are transmitted to service terminals ST). As noted above, such an optical cross-connect 307 can be controlled by a ground based gateway, but is not limited thereto.

The one hundred and twenty five optical data signals that are provided from the WDM DEMUX 306, or from the optical cross-connect switch 307, to the space segment forward link equipment 300A, may be filtered by the optional optical filters 334_125 to 334_250 before being provided to the PDs 308_1 to 308_125 of the space segment forward link equipment. Each PD 308 converts the optical signal it receives to a respective RF electrical signal. The RF electrical signal produced by each PD 308 is provided to a respective filter (FTR) 310 (e.g., a bandpass filter) to remove unwanted frequency components and/or enhance desired frequency components. For an example, each filter 310 can pass frequencies within the range of 17.7-20.2 GHz, or within the range of 17.3-20.2 GHz, but are not limited thereto. The filtered RF electrical signal, which is output by each filter 310, is provided to a respective low noise amplifier (LNA) 312. Each LNA 312 amplifies the relatively low-power RF signal it receives from a respective filter 310 without significantly degrading the signals signal-to-noise ratio. The amplified RF signal that is output by each LNA 312 is shown as being provided to a respective frequency down-converter (FDC) 314.

The space segment forward link equipment 300A is shown as including frequency down-converters (FDCs) 314_1 to 314_125, which can be collectively referred to as frequency down-converters (FDCs) 314, or individually as a frequency down-converter (FDC) 314. The space segment forward link equipment 300A is also shown as including local oscillators (LOs) 313_1 to 313_125, which can be collectively referred to as local oscillators (LOs) 313, or individually as a local oscillator (LO) 313. Each FDC 314 receives a respective amplified RF signal from an LNA 312 and a local oscillator signal from an LO 313 and frequency down converts the amplified RF signal to a frequency with a frequency range that is allocated for RF service downlink beams. An exemplary frequency range that can be allocated for RF service downlink beams is in the range of 17.7-20.2

GHz, which might be the same range as the RF downlink to RF gateways, but interference would be managed by providing spatial isolation between users and gateways using the same frequencies, or by splitting off a portion of the band for users and another portion for gateways.

The output of each FDC 314 is shown as being filtered by a respective filter (FTR) 316, and then amplified by a respective high power amplifier (HPA) 317. Each HPA 317 amplifies the RF signal it receives so that the RF signal has sufficient power to enable transmission thereof from the satellite 100 in space to a service terminal ST, which may be on the ground. Each HPA 317 can be, e.g., a liner traveling wave tube high power amplifier, but is not limited thereto. The signal that is output by each of the HPAs 317 can be referred to as an amplified RF signal. Each harmonic filter (HF) 318 is used to reduce and preferably remove any distortion in the amplified RF signal that was caused by a respective HPA 317. Each HF 318 can be, e.g., a waveguide cavity filter, but is not limited thereto. Each test coupler (TC) 319 can be used for power monitoring, payload testing and/or performing calibrations based on signals passing therethrough. Each OMJ 320 adds either right hand circular polarization (RHCP) or left hand circular polarization (LHCP) to the RF signal that is passed through the OMJ. This allows for color reuse frequency band allocation, wherein each color represents a unique combination of a frequency band and an antenna polarization. This way a pair of feeder beams that illuminate adjacent regions can utilize a same RF frequency band, so long as they have orthogonal polarizations. Each feed horn 321 converts the RF signal it receives, from a respective OMJ 320, to radio waves and feeds them to the rest of the antenna system (not shown) to focus the signal into a service downlink beam. A feed horn 321 and the rest of an antenna can be collectively referred to as the antenna. In other words, an antenna, as the term is used herein, can include a feed horn. All or some of the feed horns 321 can share a common reflector. Such reflector(s) is/are not shown in the Figures, to simply the Figures.

FIG. 3B will now be used to describe space segment forward link equipment 300B and RF-to-optical space segment forward inter-satellite link (ISL) equipment 301B, which can be used with the RF gateway forward link equipment 200B discussed above with reference to FIG. 2B. The space segment forward ISL equipment 301B, which can also be referred to as a satellite forward ISL subsystem 301B, or more generally, as a communication subsystem, can be configured to receive an RF uplink beam that is transmitted from the ground based RF gateway subsystem 200B (in FIG. 2B) to the satellite (e.g., 100) that is carrying the space segment forward ISL equipment 301B. Alternatively, or additionally, the space segment forward ISL equipment 301B can be configured to receive an RF ISL beam that is transmitted from another satellite (e.g., 150). The space segment forward ISL equipment 301B can also configured to act as an RF repeater to pass on an RF beam (or a portion thereof) that it receives (from the ground based RF gateway subsystem 200B, or from another satellite) to a further satellite (e.g., 160) as an optical ISL beam. Both the space segment forward link equipment 300B, and the space segment forward ISL equipment 301B, can be included on a same satellite (e.g., 100). This can enable the satellite (e.g., 100) to send some data that it receives (e.g., from the gateway 105) to some service terminals STs that are within a region (e.g., 108) that is illuminated by a service downlink beam (e.g., 106d) of the satellite, and send other data that it receives (from the same gateway 105) to another satellite (e.g., 150) so that the other satellite can send the other data to other service terminal STs that are within another region that is illuminated by a service downlink beam of the other satellite. In such an embodiment, the space segment forward ISL equipment 301B can share certain elements with the space segment forward link equipment 300B, as will be appreciated from FIG. 3B, and the description thereof.

The space segment forward link equipment 300B is shown as including a feed horn 322, a polarizer 324, amplifiers 325_1 and 325_2, DEMUX 326_1, filters 328_1 to 328_125, FDCs 330_1 to 330_125, FTRs 342_1 to 342_125, HPAs 344_1 to 344_2, HFs 346_1 to 346_125, TCs 348_1 to 348_125, OMJs 350_1 to 350_125, and feed horns 352_1 to 352_125.

The feed horn 322 converts the radiowaves received by an antenna thereof, which is used to receive radiowaves from a gateway or another satellite, to an RF signal that is provided to the polarizer 324. The feed horn 322 and the rest of an antenna can be collectively referred to as the antenna. In other words, an antenna, as the term is used herein, can include a feed horn. Such an antenna would also include a reflector, which is not shown in the Figures, to simply the Figures. The polarizer 324, which can also be referred to as a reverse polarizer 324, separates the RF signal it receives from the feed horn 322 into first and second RF signals. For example, a portion of the RF signal having a first polarization is separated into a first RF signal that is provided to the amplifier 325_1, and a portion of the RF signal having a second polarization, which is orthogonal to the first polarization, is separated into the second RF signal that is provided to the amplifier 325_2. For example, one polarization can be horizontal while the other is vertical, or one polarization can be right hand circular with the other is left hand circular. These are just a few examples of the orthogonal types of polarizations, which are not intended to be an exhaustive list. The amplifiers 325_1 and 325_2 amplify the RF signals output from the polarizer 324. When the RF feeder uplink beam reaches the satellite, the power of the RF feeder uplink beam is significantly attenuated compared to when it was transmitted by the ground based RF gateway subsystem 200B. Accordingly, the amplifiers 325_1 and 325_2 are used to amplify the received RF feeder uplink beam, after the uplink beam is separated into two RF signals by the polarizer 324, before the two RF signals are provided to the DEMUXES 326_1 and 326_2.

The DEMUX 326_1 separates the RF signal it receives from the amplifier 325_1 into one hundred and twenty five separate RF data signals. Similarly, the DEMUX 326_2 separates the RF signal it receives from the amplifier 325_2 into one hundred and twenty five separate RF data signals. Accordingly, in the embodiment shown, a total of two hundred and fifty RF data signals are collectively output by the DEMUXES 326_1 and 326_2.

In accordance with an embodiment, a first subset of the two hundred and fifty separate RF data signals is used to produce an optical ISL beam that is transmitted to another satellite, and a second subset of the two hundred and fifty separate RF data signals is used to produce RF service downlink beams. For example, the one hundred and twenty five RF data signals output by the DEMUX 326_1 can be used by the space segment forward link equipment 300B to produce RF service downlink beams, and the one hundred and twenty five RF data signals output by the DEMUX 326_2 can be used by the RF-to-optical space segment ISL equipment 301B to produce an optical ISL beam that is transmitted to another satellite. More generally, a first subset of the RF data signals that are output by the DEMUXES 326_1 and 326_2 are used by the space based forward ISL equipment 301B to produce an optical ISL beam that is transmitted to another satellite, and a second subset of the optical data signals that are output by the DEMUXES 326_1 and 326_2 are provided to the space segment forward link equipment 300B and used thereby to produce RF service downlink beams (e.g., 106d, 110d, 114d and 118d in FIG. 1) that are transmitted to service terminals ST, as will be described in additional detail below. The specific RF data signals (output by the DEMUXES 326_1 and 326_2) that are included in the first subset (used to produce the optical ISL beam that is transmitted to another satellite), and the specific RF data signals (output by the DEMUXES 326_1 and 326_2) that are included in the second subset (used to produce the RF service downlink beams that are transmitted to service terminals ST), can be predetermined and unchangeable on the satellite. Alternatively, the space segment equipment can include an optional cross-connect switch 327 (shown in dashed line in FIG. 3B) that can be controlled to dynamically change within the satellite which RF data signals (output by the DEMUXES 326_1 and 326_2) are included in the first subset (used to produce the optical ISL beam that is transmitted to another satellite), and which RF data signals (output by the DEMUXES 326_1 and 326_2) are included in the second subset (used to produce the RF service downlink beams that are transmitted to service terminals ST). Such a cross-connect 327 can be controlled by a ground based gateway, but is not limited thereto. It is also possible that the first and second subsets of RF data signals differ in the number of signals included in each subset.

Within the space segment forward link equipment 300B, the FTRs 328_1 though 328_125 filter the RF data signals provided thereto before the RF data signals are frequency down-converted by the FDCs 330_1 to 330_125, which also each receive a respective local oscillator signal from one of the LOs 332_1 to 332_125. The output of each FDC 330_1 through 330_125 is shown as being filtered by a respective filter (FTR) 342_1 to 342_125, and then amplified by a respective high power amplifier (HPA) 344_1 to 344_125. Each HPA 344 amplifies the RF signal it receives so that the RF signal has sufficient power to enable transmission thereof from the satellite 100 in space to a service terminal ST, which may be on the ground. Each HPA 344 can be, e.g., a liner traveling wave tube high power amplifier, but is not limited thereto. The signal that is output by each of the HPAs 344 can be referred to as an amplified RF signal. Each HF 346_1 to 346_125 is used to reduce and preferably remove any distortion in the amplified RF signal that was caused by a respective HPA 344. Each HF 346 can be, e.g., a waveguide cavity filter, but is not limited thereto. Each TC 348_1 to 348_125 can be used for power monitoring, payload testing and/or performing calibrations based on signals passing therethrough. Each OMJ 350_1 to 350_125 adds either right hand circular polarization (RHCP) or left hand circular polarization (LHCP) to the RF signal that is passed through the OMJ, or adds either horizontal polarization or vertical polarization to the RF signal that is passed through the OMJ. This allows for color reuse frequency band allocation, wherein each color represents a unique combination of a frequency band and an antenna polarization. This way a pair of feeder beams that illuminate adjacent regions can utilize a same RF frequency band, so long as they have orthogonal polarizations. Each feed horn 352_1 to 352_125 converts the RF signal it receives, from a respective OMJ 350, to radio waves and feeds them to the rest of the antenna system (not shown) to focus the signal into a service downlink beam. A feed horn 352 and the rest of an antenna can be collectively referred to as the antenna. In other words, an antenna, as the term is used herein, can include a feed horn. All or some of the feed horns 352 can share a common reflector. Such reflector(s) is/are not shown in the Figures, to simply the Figures.

Within the space segment RF-to-optical ISL equipment 301B, the FTRs 328_126 though 328_250 filter the RF data signals provided thereto before the RF data signals are optionally frequency down-converted by the optional FDCs 330_126 to 330_250 shown in dashed line, which also each receive a respective local oscillator signal from one of the LOs 332_1 to 332_125. The output of each of the FDCs 330_126 through 330_250 (or each FTR 328_126 through 328_250 if the FDCs 330_126 through 330_250 are not present) is provided to a respective EOM 332_1 to 332_125. Each EOM 332 also receives a respective optical carrier signal output by a respective one of one hundred and twenty five lasers 334_1 to 334_125, which can be referred to individually as a laser 334, or collectively as the lasers 334. Explained another way, the light emitted by each of the one hundred and twenty five lasers 334, which can be referred to as an optical carrier signal, is provided (e.g., via a respective optical fiber) to a respective one of the one hundred and twenty five separate EOMs 332_1 to 332_125.

The one hundred and twenty five separate lasers 334_1 to 334_125 each emit light of a different wavelength within a specified wavelength range that is for use in producing the optical ISL beam. The lasers as noted above can be referred to individually as a laser 334, or collectively as the lasers 334. Additionally, it is noted that the RF-to-optical space segment ISL equipment 301B may include two or more of each of the lasers (that each emit light of a different peak wavelength within a specified contiguous or non-contiguous wavelength range) to provide for redundancy or backup. Each of the lasers 334 can be, for example, a diode-pumped infrared neodymium laser, although the use of other types of lasers are also within the scope of the embodiments described herein.

The one hundred and twenty five separate optical data signals that are output by the one hundred and twenty five EOMs 332 are provided to the WDM MUX 336, which can also be referred to as a dense wavelength division multiplexing (DWDM) MUX. The WMD MUX 336 multiplexes (i.e., combines) the one hundred and twenty five optical data signals, received from the EOMs 332, onto a single optical fiber, with each of the one hundred and twenty five separate optical data signals being carried at the same time on its own separate optical wavelength within a specified range, which can be a contiguous or a non-contiguous wavelength range.

The signal that is output by the WMD MUX 336, which can be referred to as a wavelength division multiplexed optical signal, is provided to the optical amplifier (OA) 338. The OA 338 amplifies the wavelength division multiplexed optical signal so that the wavelength division multiplexed optical signal has sufficient power to enable transmission thereof to another satellite in space. An exemplary type of OA 338 that can be used is an erbium-doped fiber amplifier (EDFA). However embodiments of the present technology are not limited to use with an EDFA. The output of the OA 338 can be referred to as an optically amplified wavelength division multiplexed optical signal.

The optically amplified wavelength division multiplexed optical signal, which is output by the OA 338, is provided (e.g., via an optical fiber) to the transmitter optics 340. The transmitter optics 340, which can also be referred to as a telescope, can includes optical elements such as lenses, mirrors, reflectors, filters and/or the like. The transmitter optics 340 outputs a collimated optical feeder uplink beam that is aimed at another satellite. A gimbal, and/or the like, can be used to control the steering of the transmitter optics 340. In accordance with an embodiment, the collimated optical ISL beam has an aperture of about 40 cm, and a half beam divergence of about 0.0000012 radians, wherein the term "about" as used herein means+/−10 percent of a specified value. The use of other apertures and half beam divergence values are also within the scope of the embodiments described herein. The collimated optical ISL beam, which is output by the transmitter optics 340, is transmitted in free-space to receiver optics of another satellite.

Space Segment Return Link Equipment

FIG. 4A will now be used to describe a portion of space segment return link equipment 400A, according to an embodiment of the present technology. Such space segment return link equipment 400A, which can also be referred to as a satellite return link subsystem 400A, or more generally, as an optical communication subsystem, is configured to receive the RF signals that are transmitted by service terminals ST to the satellite (e.g., 100) that is carrying the space segment return link equipment 400A. The space segment return link equipment 400A, together with the space segment return link equipment 400B in FIG. 4B, is also configured to convert the RF signals that it receives (from the service terminals ST) into optical signals, and to produce optical return feeder beams therefrom, wherein the optical return feeder beams are for transmission from the satellite (e.g., 100) to a ground based gateway (e.g., 105). Alternatively, the space segment return link equipment 400A, together with the space segment return link equipment 400C in FIG. 4C, is configured to produce RF return feeder beams for transmission from the satellite (e.g., 100) to a ground based gateway (e.g., 105) based on RF signals that it receives from service terminals ST.

Referring to FIG. 4A, the portion of the space segment return link equipment 400A shown therein includes feed elements 402_1 to 402_250 (which can be referred to individually as a feed element 402, or collectively as the feed elements 402), orthomode junctions (OMJs) 404_1 to 404_250 (which can be referred to individually as an OMJ 404, or collectively as the OMJs 404), test couplers (TCs) 406_1 to 406_250 (which can be referred to individually as a TC 406, or collectively as the TCs 406), pre-select filters (PFs) 408_1 to 408_250 (which can be referred to individually as a PF 408, or collectively as the PFs 408), low noise amplifiers (LNAs) 410_1 to 410_250 (which can be referred to individually as an LNA 410, or collectively as the LNAs 410), and filters (FTRs) 412_1 to 412_250 (which can be referred to individually as a filter 412, or collectively as the filters 412). The portion of the space segment return link equipment 400A shown in FIG. 4A also includes frequency down-converters (FDCs) 416_1 to 416_250 (which can be referred to individually as a frequency down-converter 416, or collectively as the frequency down-converters 416), filters (FTRs) 418_1 to 418_250 (which can be referred to individually as a filter 418, or collectively as the filters 418), and local oscillators (LOs) 422_1 to 422_10 (which can be referred to individually as an LO 422, or collectively as the LOs 422). The portion of the space segment return link equipment 400A shown in FIG. 4A also includes combiners 420_1 to 420_25 (which can be referred to individually as a combiner 420, or collectively as the combiners 420).

Each feed element 402 gathers and focuses radio waves of a service uplink beam (e.g., 106u) and converts them to an RF signal that is provided to a respective OMJ 404. A feed element 402 and the rest of an antenna can be collectively referred to as the antenna or antenna system. In other words, an antenna, as the term is used herein, can include a feed element. All or some of the feed elements 402 can share a common reflector. Such reflector(s) is/are not shown in the Figures, to simplify the Figures. Each OMJ 404 either passes through a right hand circular polarization (RHCP) or a left hand circular polarization (LHCP) RF signal. Each OMJ 404 can alternatively pass through either a horizontal or a vertical linear polarization RF signal. Each test coupler TC 406 can be used for power monitoring, payload testing and/or performing calibrations based on signals passing therethrough. Each pre-select filter (PF) 408 (e.g., a bandpass filter) is used to remove unwanted frequency components and/or enhance desired frequency components. For an example, each PF 408 can pass frequencies within the range of 29.5-30.0 GHz, but is not limited thereto. Each LNA 410 amplifies the relatively low-power RF signal it receives from a respective PF 408 without significantly degrading the signals signal-to-noise ratio. The amplified RF signal that is output by each LNA 410 is provided to a respective filter 412.

Each filter 412 allows frequencies to pass within a specified frequency range (e.g., 29.50-30.00 GHz), and the filters 418 that are downstream of the frequency down-converters 416 are used to filter out unwanted frequency components (e.g., unwanted mixed products) that result from the frequency down-conversions.

Each frequency down-converter 416 receives an RF signal from a filter 412 (which RF signal includes data from a uplink beam, and thus, can be referred to as an RF data signal) and an RF signal from an LO 422 (which can be referred to as an LO signal), and uses the LO signal to down-convert the RF data signal to a frequency range (e.g., 6.70-7.2 GHz, or 6.3-7.2 GHz, or some other frequency range within the 6-12 GHz band) that can be used for transmitting feeder downlink signals (e.g., 102d) to a gateway (e.g., 105). The output of each frequency down-converter 416 is provided to a filter 418. For example, the frequency down-converter 416_1 provides its output to the filter 418_1, and the frequency down-converter 416_2 provides its output to the filter 418_2. The filter 418_1 can be a bandpass filter that allows frequencies to pass within a specified frequency range (e.g., 6.70-7.2 GHz, or 6.3-7.2 GHz, or some other frequency range within the 6-12 GHz band).

In the embodiment of FIG. 4A, the outputs of ten filters 418 are provided to a combiner 420. For example, the outputs of filters 418_1, 418_2, 418_3 . . . 418_10 are provided the combiner 420_1. Each combiner 420 combines the ten down-converted and filtered signals it receives into a combined signal that includes data modulated RF carriers for ten service uplink beams. In other words, the output of each combiner 420 includes data received from ten service uplink beams associated with at least ten service terminals ST. The output of each combiner 420 is provided to a separate EOM 434, as will be discussed below with reference to FIG. 4B.

FIG. 4B will now be used to describe a further portion of the space segment return link equipment 400B that is used to convert the data modulated RF carrier signals into a collimated optical downlink feeder beam that is aimed at a gateway. Referring to FIG. 4B, the portion of the space segment return link equipment 400B is shown as including twenty five lasers 432_1 to 432_25, twenty five electro-optical modulator (EOMs) 434_1 to 434_25, a wavelength-division multiplexing (WDM) multiplexer (MUX) 436, an optical amplifier (OA) 438 and transmitter optics 440. Each of these elements are described below.

The twenty five separate lasers 432_1 to 432_25 each emit light of a different wavelength within a specified wavelength range. The lasers can be referred to individually as a laser 432, or collectively as the lasers 432. Where the specified wavelength range is, for example, from 1560 nm to 1570 nm, then the laser 432_1 may emit light having a peak wavelength of 1560 nm, the laser 432_2 may emit light having a peak wavelength of 1560.4 nm, the laser 432_3 (not shown) may emit light having a peak wavelength of 1560.8 nm, . . . the laser 432_24 may emit light having a peak wavelength of 1669.6 nm, and the laser 432_25 may emit light having a peak wavelength of 1670.0 nm. In other words, the peak wavelengths emitted by the lasers 432 can occur at 0.4 nm intervals from 1560 nm to 1570 nm. The wavelength range from 1560 nm to 1570 nm, which is within the IR spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder downlink beam (e.g., 102d) is non-contiguous. For example, the wavelength range that is for use in producing the optical feeder downlink beam can be from 1535 nm to 1540 nm and from 1565 nm to 1575 nm. These are just a few examples, which are not intended to be all encompassing. Further, it is also possible that space segment return link equipment can alternatively include more or less than twenty five lasers (that each emit light of a different peak wavelength within a specified contiguous or non-contiguous wavelength range). Additionally, it is noted that the space segment return link equipment may include two or more of each of the lasers (that each emit light of a different peak wavelength within a specified contiguous or non-contiguous wavelength range) to provide for redundancy or backup. Each of the lasers 432 can be, for example, a diode-pumped infrared neodymium laser, although the use of other types of lasers are also within the scope of the embodiments described herein.

In accordance with certain embodiments, the space segment return link equipment 400B includes less lasers (e.g., twenty five lasers 432) for use in generating the optical feeder downlink beam that is aimed from the satellite 100 to the gateway 105, than the gateway forward link equipment 200 includes (e.g., two hundred and twenty five lasers 202) for generating the optical feeder uplink beam that is aimed from the gateway 105 to the satellite 100. This is made possible due to current asymmetric capacity requirements between the forward and return feeder links. More specifically, a feeder downlink beam (e.g., 102d) carries significantly less data than a feeder uplink beam (e.g., 102u), because service terminals ST typically download much more data than they upload.

On the return link, given the current asymmetric capacity requirements between the forward and return links, the space segment return link equipment can be implemented to handle less demand that the ground based forward link equipment. As an example, if each RF service uplink beam is assumed to have only 320 MHz per beam, then a total of 160 GHz needs to be sent from a satellite to a gateway on the optical feeder downlink beam. Several beams' frequencies can be grouped together to create a 4 GHz bandwidth which is then transmitted on each of twenty five laser wavelengths that are multiplexed together and transmitted to the ground. An alternative implementation would be to aggregate the 4 GHz spectrum with filtering post LNA to eliminate the RF frequency conversion and as above directly modulate the RF spectrum on each of the twenty five laser wavelengths. An alternative implementation would be to use only RF LNAs for each feed, modulate each 320 MHz segment of bandwidth onto a single laser and combine two hundred and twenty five laser wavelengths together, thus eliminating the need for RF frequency converters. Depending on the number of service beams and feeder beams required, one or the other configuration can be selected to provide the lowest mass solution.

The light emitted by each of the twenty five lasers 432, which can be referred to as an optical carrier signal, is provided (e.g., via a respective optical fiber) to a respective one of the twenty five separate EOMs 434_1 to 434_25. The EOMs can be referred to individually as an EOM 434, or collectively as the EOMs 434. Each of the EOMs 434 is an optical device in which a signal-controlled element exhibiting an electro-optic effect is used to modulate a respective beam of light. The modulation performed by the EOMs 434 may be imposed on the phase, frequency, amplitude, or polarization of a beam of light, or any combination thereof. In accordance with a specific embodiment, each of the EOMs 434 is a phase modulating EOM that is used as an amplitude modulator by using a Mach-Zehnder interferometer. In other words, each of the EOMs 434 can be implemented as a Mach-Zehnder modulator (MZM), which can be a Lithium Niobate Mach-Zehnder modulator, but is not limited thereto. In accordance with specific embodiments, each of the EOMs 434 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 434 can be referred to as an optical data signal. The modulation scheme that is implemented by the EOMs 434 can result in double- or vestigial-sidebands, including both an upper sideband (USB) and a lower sideband (LSB). Alternatively single-sideband modulation (SSB) can be utilized to increase bandwidth and transmission power efficiency.

The twenty five separate optical data signals that are output by the fifty EOMs 434 are provided to the WDM MUX 436, which can also be referred to as a dense wavelength division multiplexing (DWDM) MUX. The WMD MUX 436 multiplexes (i.e., combines) the twenty five optical data signals, received from the twenty five EOMs 434, onto a single optical fiber, with each of the twenty five separate optical data signals being carried at the same time on its own separate optical wavelength within a specified contiguous wavelength range (e.g., from 1560 nm to 1570 nm) or non-contiguous wavelength range (e.g., from 1510 nm to 1535 nm, and from 1540 nm to 1565 nm). For example, as explained above, the twenty five optical data signals can have peak wavelengths that occur at 0.4 nm intervals from 1560 nm to 1570 nm, but are not limited thereto.

The signal that is output by the WMD MUX 436, which can be referred to as a wavelength division multiplexed optical signal, is provided to the optical amplifier (OA) 438. The OA 438 amplifies the wavelength division multiplexed optical signal so that the wavelength division multiplexed optical signal has sufficient power to enable transmission thereof from the satellite 100 in free-space to the gateway 105. The OA 438 can be an erbium-doped fiber amplifier (EDFA), but is not limited thereto. The output of the OA 438 can be referred to as an optically amplified wavelength division multiplexed optical signal.

The optically amplified wavelength division multiplexed optical signal, which is output by the OA 438, is provided (e.g., via an optical fiber) to the transmitter optics 440. The transmitter optics 440, which can also be referred to as a telescope, can includes optical elements such as lenses, mirrors, reflectors, filters and/or the like. The transmitter optics 440 outputs a collimated optical feeder downlink beam that is aimed at a satellite. A gimbal, and/or the like, can be used to control the steering of the transmitter optics 440. In accordance with an embodiment, the collimated optical feeder downlink beam has an aperture of about 40 cm, and a half beam divergence of about 0.0000012 radians, wherein the term "about" as used herein means+/−10 percent of a specified value. The use of other apertures and half beam divergence values are also within the scope of the embodiments described herein. The collimated optical feeder downlink beam, which is output by the transmitter optics 440, is transmitted in free-space to receiver optics in the gateway 105.

A space segment (e.g., a satellite 100) can have different optics that are used for transmitting an optical feeder downlink beam (e.g., 102*d*) to a gateway, than the optics that are used for receiving an optical feeder uplink beam (e.g., 102*u*) from a gateway. Alternatively, and preferably, to reduce the weight that needs to be carried by the space segment (e.g., a satellite 100), the same optics can be used for both transmitting an optical feeder downlink beam (e.g., 102*d*) to a gateway and for receiving an optical feeder uplink beam (e.g., 102*u*) from a gateway. More specifically, the TX optics 440 shown in FIG. 4B can be the same as the RX optics 302 shown in FIG. 3. Additional and/or alternative components can be shared between the space segment forward link equipment shown in FIG. 3A and the space segment return link equipment shown in FIGS. 4A and 4B. For example, the feed elements 326 in FIG. 3A can be the same as the feed elements 402 shown in FIG. 4A. For another example, the OMJs 320 in FIG. 3A can be the same as the OMJs 404 in FIG. 4A, if the OMJs are implement as a three-port device. These are just a few example, which are not intended to be all encompassing.

Referring again to the EOMs 434 in FIG. 4B, in accordance with certain embodiments of the present technology, each of the EOMs 434 modulates the optical signal it receives (e.g., via an optical fiber from a respective laser 432) with a separate RF signal that has already been modulated to include user data. For example, the EOM 434_1 modulates the optical signal it receives from the laser 431_1 with a data modulated RF carrier signal it receives from the combiner 420_1 (in FIG. 4A). The data modulated RF carrier signal that the EOM 434_1 receives from a combiner (420_1 in FIG. 4A) can include data corresponding to ten service uplink beams received from service terminals ST. Similarly, the EOMs 434_2 to 434_50 can each receive a different data modulated RF carrier signal, from a different combiner 420, with each data modulated RF carrier signal corresponding to a different group of ten service uplink beams received from service terminals ST. In this manner, the EOMs 434 can be collectively provided with data modulated RF carrier signals corresponding to two hundred and fifty service uplink beams (i.e., 25*10=250).

FIG. 4B was used to describe a portion of the space segment return link equipment 400B that can be used to produce an optical return feeder beams are for transmission from the satellite (e.g., 100) to a ground based gateway (e.g., 105). FIG. 4C will now be used to describe an alternative portion of the space segment return link equipment 400C that can be used to produce RF return feeder beams for transmission from the satellite (e.g., 100) to a ground based gateway (e.g., 105) based on RF signals that it receives from service terminals ST.

Referring to FIG. 4C, the space segment return link equipment 400C is shown as including multiplexers (MUXES) 448_1 and 448_2, amplifier 451_1 and 451_2, a polarizer 452, and a feed horn 454. The MUX 448_1 is shown as receiving outputs of a plurality of the combiners 420 discussed above with reference to FIG. 4A, and the MUX 448_1 is shown as receiving outputs of another plurality of the combiners 420 discussed above with reference to FIG. 4A. Explained another way, each input to each of the MUXES 448 receives a data modulated RF carrier signal corresponding to ten (or some other number) of user uplink beams received from service terminals ST. The MUX 448_1 multiplexes the data modulated RF carrier signals it receives into a first multiplexed RF signal that is amplified by the amplifier 451_1 before it is provided to the polarizer 452. Similarly, MUX 448_2 multiplexes the data modulated RF carrier signals it receives into a second multiplexed RF signal that is amplified by the amplifier 451_2 before it is provided to the polarizer 452.

The polarizer 452 receives the first and second multiplexed signals 449_1 and 449_2, after they are amplified by respective amplifiers 451_1 and 452_2, and the polarizer 452 applies orthogonal polarizations to the two signals so that they can be combined into one signal by the feed horn 454. For example, one polarization can be horizontal while the other is vertical, or one polarization can be right hand circular with the other is left hand circular. These are just a few examples of the orthogonal types of polarizations, which are not intended to be an exhaustive list. The amplifiers 451_1 and 451_2 amplify the multiplexed signals 449_1 and 449_2 output from the multiplexers 448_1 and 448_2 so that the RF signal to be transmitted has sufficient power to enable transmission thereof from the satellite 100 in space to the ground based gateway 105.

Gateway Return Link Equipment

FIG. 5A will now be used to describe optical gateway return link equipment 500A, according to an embodiment of the present technology, which is configured to receive an optical feeder downlink beam from a satellite. Such gateway return link equipment 500A can also be referred to as an optical gateway return link subsystem 500A, or more generally, as an optical communication subsystem. Referring to FIG. 5A, the optical gateway return link subsystem 500A is shown as including receiver optics 502, an optical amplifier (OA) 504, a wavelength-division multiplexing (WDM) demultiplexer (DEMUX) 506, twenty five photodetectors (PDs) 508_1 to 508_25, twenty five filters (FTRs) 510_1 to 510_25, twenty five low noise amplifiers (LNAs) 512_1 to 512_25, and twenty five frequency down-converters (FDCs) 514_1 to 514_25. The optical gateway return link subsystem 500 is also shown as including a ground based beamformer (GBBF) 515, M demodulator and digital signal processor (DSP) blocks 516_1 to 516_M, and twenty five local oscillators (LOs) 522_1 to 522_25 (which can be referred to individually as an LO 522, or collectively as the LOs 522).

The receiver optics 502, which can also be referred to as a telescope, can includes optical elements such as mirrors, reflectors, filters and/or the like. The receiver optics 502 receives the optical feeder downlink beam (e.g., 102*d*) that is transmitted through free-space from a space segment (e.g., a satellite 100), by the space based return link subsystem 400A and 400B, and provides the received optical feeder downlink beam (e.g., via an optical fiber) to the OA 504. A gimbal, and/or the like, can be used to control the steering of the receiver optics 502. When the optical feeder downlink beam reaches the gateway, the power of the optical feeder downlink beam is significantly attenuated compared to when it was transmitted by the space based return link subsystem. Accordingly, the OA 504 is used to amplify the received optical feeder downlink beam before it is provided to the WDM DEMUX 506. The OA 504 can be, e.g., an erbium-doped fiber amplifier (EDFA), but is not limited thereto. The output of the OA 504 can be referred to as an optically amplified received optical feeder downlink beam. The WDM DEMUX 506 demultiplexes (i.e., separates) the received optical feeder uplink beam (after it has been optically amplified) into fifty separate optical signals, each of which is provided to a separate photodetector (PD) 508. Each PD 508 converts the optical signal it receives from the WDM DEMUX 506 to a respective RF electrical signal. The RF electrical signal produced by each PD 508 is provided to a respective filter (FTR) 510 (e.g., a bandpass filter) to remove unwanted frequency components and/or enhance desired frequency components. For an example, where frequency down-conversions were performed on the satellite (by the FDCs 416 of the space segment return link equipment 400A), each filter 510 can pass frequencies within the range of 6.70-7.2 GHz, or within the range of 6.3-7.2 GHz, but are not limited thereto. For another example, where frequency down-conversions were not performed on the satellite, each filter 510 can pass frequencies within the range of 29.5-30 GHz, but are not limited thereto. The filtered RF electrical signal, which is output by each filter 408, is provided to a respective low noise amplifier (LNA) 512. Each LNA 512 amplifies the relatively low-power RF signal it receives from a respective filter 510 without significantly degrading the signals signal-to-noise ratio. The amplified RF signal that is output by each LNA 512 is provided to a respective frequency down-converter 514, the output of which is provided to the GBBF 515, which outputs signals provided to demodulator and DSP blocks 516.

Each frequency down-converter 514 receives an RF signal from an LNA 512 (which RF signal includes data from subscriber terminals STs, and thus, can be referred to as an RF data signal) and an RF signal from an LO 452 (which can be referred to as an LO signal), and uses the LO signal to down-convert the RF data signal to baseband. The baseband data signal output by each frequency down-converter 514 is provided to the GBBF 515. The GBBF 515 can be referred to more specifically as the return link GBBF 515, so as to distinguish it from the GBBF 230, which can be referred to more specifically as the forward link GBBF 230. The return link GBBF 515 uses calibration information received from a calibration subsystem, to produce M baseband spot beams (where, M can equal 1000 beams as on the forward link, or in some systems, the forward and return beam counts could be different from one another) Each of the M spot beam signals is provided to a respective demodulator and DSP block 516. Each demodulator and DSP block 516 demodulates the baseband spot beam signal it receives, and performs digital signal processing thereon. Such a demodulated data signal can be used to provide data to, or request data from, a server, client and/or the like that is coupled to a network (e.g., the network 140 in FIG. 1).

A gateway (e.g., 105) can have different optics that are used for transmitting an optical feeder uplink beam (e.g., 102u) to a space segment (e.g., satellite 100), than the optics that are used for receiving an optical feeder downlink beam (e.g., 102d) from a space segment. Alternatively, a gateway can use the same optics for both transmitting an optical feeder uplink beam (e.g., 102u) to a space segment and for receiving an optical feeder downlink beam (e.g., 102d) from a space segment. More specifically, the RX optics 502 shown in FIG. 5A can be the same as the TX optics 210 shown in FIG. 2A.

FIG. 5B will now be used to describe optical gateway return link equipment 500B, according to an embodiment of the present technology, which is configured to receive an RF feeder downlink beam from a satellite. Such gateway return link equipment 500B can also be referred to as an RF gateway return link subsystem 500B, or more generally, as an RF communication subsystem. Referring to FIG. 5B, the RF gateway return link subsystem 500B is shown as including a feed horn 560, a polarizer 562, amplifiers 564_1 and 564_2, DEMUXES 566_1 and 566_2, filters 568_1 to 568_50, FDCs 570_1 to 570_50, a GBBF 515, M demodulator and digital signal processor (DSP) blocks 516_1 to 516_M, and twenty five local oscillators (LOs) 522_1 to 522_25 (which can be referred to individually as an LO 522, or collectively as the LOs 522).

The feed horn 560 converts the radiowaves received by an antenna thereof, which is used to receive radiowaves from a satellite, to an RF signal that is provided to the polarizer 562. The feed horn 560 and the rest of an antenna can be collectively referred to as the antenna. In other words, an antenna, as the term is used herein, can include a feed horn. Such an antenna would also include a reflector, which is not shown in the Figures, to simply the Figures. The polarizer 562, which can also be referred to as a reverse polarizer 562, separates the RF signal it receives from the feed horn 560 into first and second RF signals. For example, a portion of the RF signal having a first polarization is separated into a first RF signal that is provided to the amplifier 564_1, and a portion of the RF signal having a second polarization, which is orthogonal to the first polarization, is separated into the second RF signal that is provided to the amplifier 564_2. For example, one polarization can be horizontal while the other is vertical, or one polarization can be right hand circular with the other is left hand circular. These are just a few examples of the orthogonal types of polarizations, which are not intended to be an exhaustive list. The amplifiers 564_1 and 564_2 amplify the RF signals output from the polarizer 562. When the RF feeder downlink beam reaches the gateway from a satellite, the power of the RF feeder downlink beam is significantly attenuated compared to when it was transmitted by the satellite based space segment return link equipment (e.g., 400A and 400C). Accordingly, the amplifiers 564_1 and 564_2 are used to amplify the received RF feeder downlink beam, after the downlink beam is separated into two RF signals by the polarizer 562, before the two RF signals are provided to the DEMUXES 566_1 and 566_2.

The DEMUX 566_1 separates the RF signal it receives from the amplifier 564_1 into twenty five separate RF data signals. Similarly, the DEMUX 566_2 separates the RF signal it receives from the amplifier 563_2 into twenty five separate RF data signals. Accordingly, in the embodiment shown, a total of fifty RF data signals are collectively output by the DEMUXES 566_1 and 566_2. The RF data signals output of the DEMUXES 566_1 and 566_2 are filtered by the filters 568, frequency down-converted (e.g., to baseband frequencies) by the FDCs 570. The baseband data signal output by each of the frequency down-converters 570 is provided to the GBBF 515. The GBBF 515 can be referred to more specifically as the return link GBBF 515, so as to distinguish it from the GBBF 230, which can be referred to more specifically as the forward link GBBF 230. The return link GBBF 515 uses calibration information received from a calibration subsystem, to produce M baseband spot beams (where, M can equal 1000 beams as on the forward link, or in some systems, the forward and return beam counts could be different from one another) Each of the M spot beam signals is provided to a respective demodulator and DSP block 516. Each demodulator and DSP block 516 demodulates the baseband spot beam signal it receives, and performs digital signal processing thereon. Such a demodulated data signal can be used to provide data to, or request data from, a server, client and/or the like that is coupled to a network (e.g., the network 140 in FIG. 1).

FIG. 5C will now be used to provide details of the return link GBBF 515 introduced in FIGS. 5A and 5B, according to certain embodiments of the present technology. Referring to FIG. 5B, the GBBF 515 is shown as including a GBBF controller 532 and twenty five one-to-ten (1 to 10) splitters 534_1 to 534_25. Each individual splitter 534_1 to 534_25 (which can be referred to collectively as the splitters 534, or individually as a splitter 534) receives a respective one of the twenty five aggregate signals (aggregate signal_1, aggregate signal_2 . . . aggregate signal_25) and outputs ten copies of the aggregate signal received by the splitter 534. The aggregate signal received by each of the splitters 524 is an aggregate of ten feed element signals, each of which corresponds to an output of one of the combiners 420 shown in and described above with reference to FIG. 4A (which output is provided to one of the EOMs 434 in FIG. 4B). The ten outputs of each of the splitters 534 are provided to a different one of ten frequency down converters (FDCs) 536. Each of the FDCs receives a different RF signal from a different one of ten local oscillators (LOs) 516_1 to 516_10 (which can be referred to individually as an LO 516, or collective as the LOs 516), and thereby frequency shifts each of the copies of an aggregate signal. This way when the ten separately frequency shifted copies of the aggregate signal are passed through a respective one of the filters (FTRs) 538, which have a common band pass frequency range, the ten feed elements signals that were included in an aggregate signal are separated into ten separate feed element signals at the outputs of the FTRs 538. In the embodiment shown in FIG. 5C, there are twenty five groups of ten FDCs 536, and thus a total of two hundred and fifty FDCs 536, and there are a total of twenty five groups of ten FTRs 538, and thus a total of two hundred and fifty FTRs 538. In the manner described above, the outputs of the two hundred and fifty filters 538 are two hundred and fifty feed element signals that correspond to the outputs of the FTRs 418 described above with reference to FIG. 4A. In accordance with certain embodiments, the functions of the splitters 534, the FDCs 536, the FTRs 538 and the splitters 540 are performed using a digital signal processor (DSP) instead of N separate splitters. In other words, a DSP can perform the signal copying or replication.

In order to form one thousand spot beams signals from the two hundred and fifty feed element signals (that are respectively output from the two hundred and fifty FTRs 538 in FIG. 5C), each of the feed element signals is provided to a respective one-to-one thousand (1 to 1000) splitter 540. Each individual splitter 540 receives a respective one of the the two hundred and fifty feed element signals and outputs one thousand copies of the feed element signal received by the splitter 540. Each copy of a feed element signals is provided to a respective phase and amplitude weight elements 542, which can be implemented in hardware, but are most likely implemented in software and/or firmware. The GBBF controller 532 uses calibration signals (received from a calibration subsystem) to derive element specific amplitude and phase corrections that are provided to the phase and amplitude weight elements 542, to thereby apply the corrections to the component element signals provided thereto. An output of each of the phase and amplitude weight elements 542 is provided to one of one thousand summers 544_1 to 544_1000 (which can be referred to individually as a summer 544, or collectively as the summers 544). The outputs of the summers 544_1 to 544_1000 are the baseband spot beam signals that are provided to a spot beam to user data controller 550, which can be considered part of the GBBF 515, or can be considered external thereto. In the embodiment shown, the spot beam to user data controller 550 maps the one thousand spot beam signals output by the summers 544 to ten thousand user data signals. The user data signals are what can be provided to the demodulator and DSP blocks 516 shown in FIG. 5A, which was discussed above.

The GBBF 515 can be implemented entirely in software. Alternatively, or additionally, the GBBF 515 can be implemented in hardware and/or firmware. The outputs of the phase and amplitude weight elements 542 can be referred to a component element signals. The outputs of the summers 544, which outputs are referred to as the baseband spot beam signals above, can also be referred to as composite signals, since they are a composite of a plurality of component element signals. The splitters 534 and 540 and the weighting elements 542 can be collectively referred to as a signal replication and reverse beamforming weighting unit 533. The same calibration subsystem that provides calibration signals to the GBBF controller 232 can provide calibration signals to the GBBF controller 532. The GBBF controller 532, which receives the calibration signals, can be the same as the GBBF controller 232, or distinct therefrom.

As noted above, a DSP can perform the signal copying or replication performed by the splitters 534, the FDCs 536, the FTRs 538 and the splitters 540. More generally, all of the functions of the elements described within the block labeled GBBF 515 can be implemented by a DSP. In other words, the GBBF 515 can be entirely or substantially entirely implemented using a DSP. Nevertheless, it is useful to shown and describe the elements shown in FIG. 5C in order to understand the operation of such a DSP. The spot beam to user data controller 550 can also be implemented by the DSP.

Methods

Figure 6:
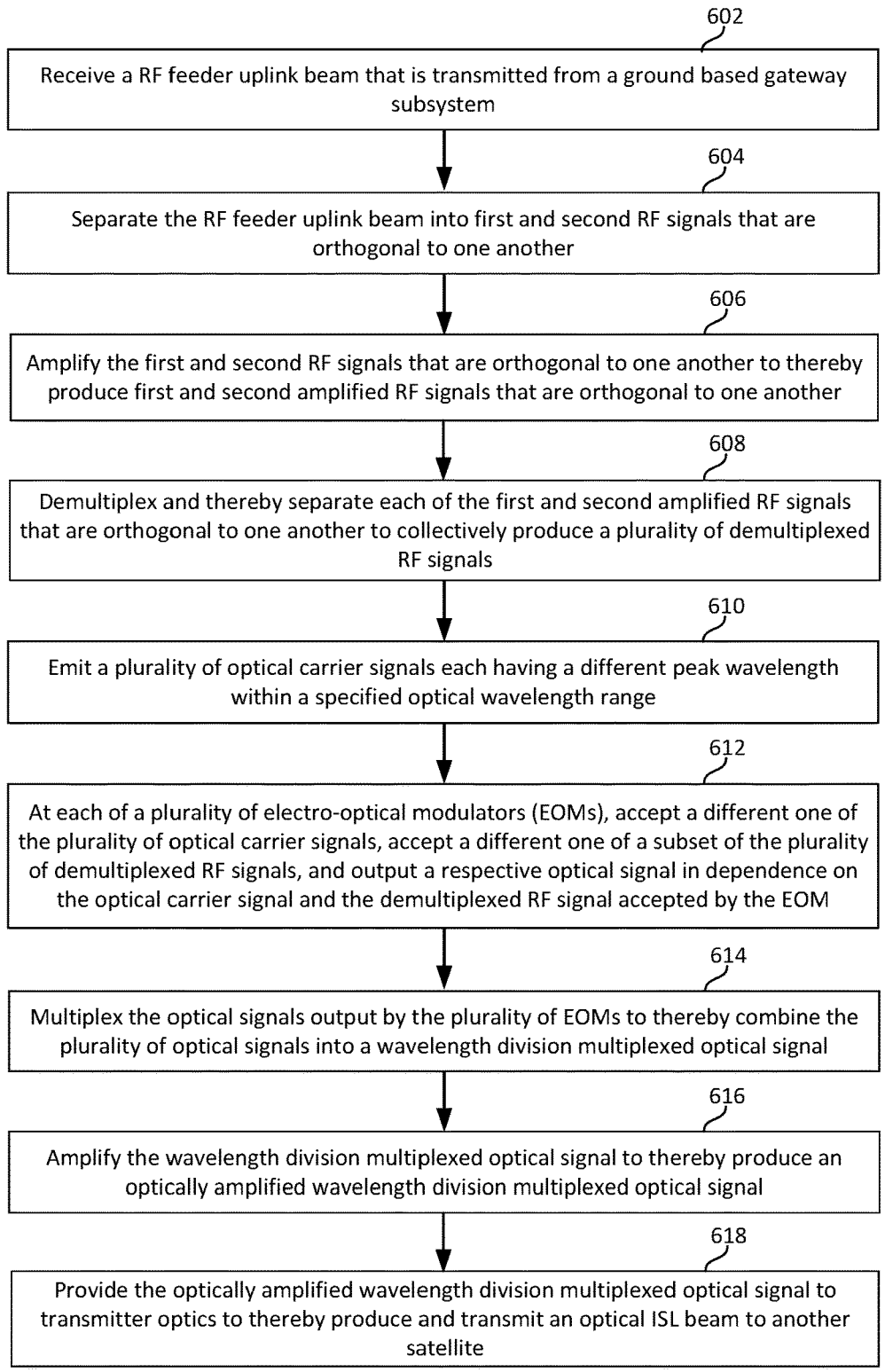
FIG. 6 is a high level flow diagram that is used to summarize methods according to certain embodiments of the present technology.

FIG. 6 will now be used to summarize methods for enabling a space based subsystem of the satellite to receive the RF feeder uplink beam (that is transmitted by a ground based gateway subsystem) and produce therefrom and transmit to another satellite an optical inter-satellite-link (ISL) beam.

Referring to FIG. 6, step 602 involves receiving a radio frequency (RF) feeder uplink beam that is transmitted from a ground based gateway subsystem (e.g., the gateway forward link equipment 200B in FIG. 2B). Step 602 can be performed, e.g., by the space segment forward link equipment 300B in FIG. 3B, and more specifically, one or more antenna thereof. In accordance with certain embodiments, the RF feeder uplink beam, that is received from the ground based gateway subsystem, is produced in part using ground based beamforming. For example, the GBBF 230 described above with reference to FIGS. 2A and 2B can be used to produce the RF feeder uplink beam.

Still referring to FIG. 6, step 604 involves separating the RF feeder uplink beam into first and second RF signals that are orthogonal to one another. Step 604 can be performed, e.g., by the polarizer 324 (which can also be referred to as a reverse polarizer 324) that was described above with reference to FIG. 3B.

Step 606 involves amplifying the first and second RF signals that are orthogonal to one another to thereby produce first and second amplified RF signals that are orthogonal to one another. Step 606 can be performed, e.g., by the amplifiers 325 described above with reference to FIG. 3B.

Step 608 involves demultiplexing and thereby separating each of the first and second amplified RF signals that are orthogonal to one another to collectively produce a plurality of demultiplexed RF signals. Step 608 can be performed, e.g., by the demultiplexers 326 described above with reference to FIG. 3B.

Step 610 involves emitting a plurality of optical carrier signals each having a different peak wavelength within a specified optical wavelength range. Step 610 can be performed, e.g., by the lasers 334 described above with reference to FIG. 3B. The specified optical wavelength range can be, e.g., a contiguous, or a non-contiguous, optical wavelength range within an infrared (IR) spectrum, but is not limited thereto.

Step 612 involves, at each of a plurality of electro-optical modulators (EOMs), accepting a different one of the plurality of optical carrier signals, accepting a different one of a subset of the plurality of demultiplexed RF signals, which is optionally frequency up-converted and filtered prior to being accepted by the EOM, and outputting a respective optical signal in dependence on the optical carrier signal and the demultiplexed RF signal accepted by the EOM. Step 610 can be performed, e.g., by the EOMs 332 described above with reference to FIG. 3B. In accordance with certain embodiments, the RF signals are each filtered and/or frequency down-converted before being provided to a respective EOM.

Step 614 involves multiplexing the optical signals output by the plurality of EOMs to thereby combine the plurality of optical signals into a wavelength division multiplexed optical signal. Step 614 can be performed, e.g., by the WDM multiplexer 336 described above with reference to FIG. 3B.

Step 616 involves amplifying the wavelength division multiplexed optical signal to thereby produce an optically amplified wavelength division multiplexed optical signal. Step 616 can be performed, e.g., by the optical amplifier 338 described above with reference to FIG. 3B.

Step 618 involves providing the optically amplified wavelength division multiplexed optical signal to transmitter optics to thereby produce and transmit an optical inter-satellite-link (ISL) beam to another satellite. The TX optics 340 described above with reference to FIG. 3B can be used to produce and transmit the optical ISL beam to another satellite.

In accordance with certain embodiments, RF frequencies of the wavelength division multiplexed optical signal (resulting from step 614, amplified at step 616, and transmitted at step 618) are within a same specified RF frequency range within which the other satellite (to which the optical ISL is transmitted at step 618) is configured to transmit a plurality of RF service downlink beams, thereby eliminating any need for the other satellite to perform any frequency conversions when producing the plurality of RF service downlink beams in dependence on the optical ISL beam. The specified RF frequency range within which the other satellite is configured to produce and transmit a plurality of RF service downlink beams can be, e.g., within a downlink portion of the Ka band.

A method can also include producing and transmitting a plurality of RF service downlink beams based on a second subset of the plurality of demultiplexed RF signals. The method can further include separating the plurality of demultiplexed RF signals into first and second subsets of demultiplexed RF signals. The first set of demultiplexed RF signals can be accepted by the EOMs, optionally after being frequency up-converted and filtered prior to being accepted by the EOMs. The second set of demultiplexed RF signals can be provided to forward link equipment that is used to produce and transmit the plurality of RF service downlink beams based on the second subset of the plurality of demultiplexed RF signals. Each of the RF signals in the first set of demultiplexed RF signals can be filtered and/or frequency down-converted before the RF signals are provided to and accepted by the EOMs.

Further details of the methods summarized with reference to FIG. 6 can be appreciated from the above description of FIGS. 1-5.

Certain embodiments of the present technology described above relate to a space based subsystem of a satellite. The space based subsystem includes one or more antennas, a polarizer, first and second amplifiers, first and second demultiplexers, a plurality of lasers, a plurality of EOMs, a WDM multiplexer, an optical amplifier, and transmitter optics. The one or more antennas is/are configured to receive a radio frequency (RF) feeder uplink beam that is transmitted from a ground based gateway subsystem. The polarizer is configured to separate the RF feeder uplink beam into first and second RF signals that are orthogonal to one another. The first and second amplifiers are configured to respectively amplify the first and second RF signals that are orthogonal to one another to thereby produce first and second amplified RF signals that are orthogonal to one another. The first and second demultiplexers are configured demultiplex and thereby separate, respectively, each of the first and second amplified RF signals that are orthogonal to one another into a plurality of demultiplexed RF signals. Each of the plurality of lasers is operable to emit an optical signal having a different peak wavelength within a specified optical wavelength range. Each EOM of the plurality of EOMs configured to accept an optical carrier signal from a respective one of the plurality of lasers, accept a different one of a subset of the plurality of demultiplexed RF signals, which is optionally frequency up-converted and filtered prior to being accepted by the EOM, and output a respective optical signal in dependence on the optical carrier signal and the demultiplexed RF signal accepted by the EOM. The WDM multiplexer is configured to accept the optical signals output by the plurality of EOMs, and combine the plurality of optical signals into a wavelength division multiplexed optical signal. The optical amplifier is configured to amplify the wavelength division multiplexed optical signal to thereby produce an optically amplified wavelength division multiplexed optical signal. The transmitter optics is/are configured to accept the optically amplified wavelength division multiplexed optical signal and transmit an optical inter-satellite-link (ISL) beam to another satellite in dependence thereon.

In accordance with certain embodiments, the RF feeder uplink beam, that the one or more antennas is/are configured to receive from a ground based gateway subsystem, is produced in part using ground based beamforming.

In accordance with certain embodiments, RF frequencies of the wavelength division multiplexed optical signal are within a same specified RF frequency range within which the other satellite is configured to transmit a plurality of RF service downlink beams, thereby eliminating any need for the other satellite to perform any frequency conversions when producing the plurality of RF service downlink beams in dependence on the optical ISL beam.

In accordance with certain embodiments, filters are included within signal paths between the demultiplexers and the WDM multiplexer.

In accordance with certain embodiments, the specified optical wavelength range is either a contiguous, or a non-contiguous, optical wavelength range within an infrared (IR) spectrum.

In accordance with certain embodiments, the space based subsystem further comprises forward link equipment that is configured to produce and transmit a plurality of RF service downlink beams based on a second subset of the plurality of demultiplexed RF signals.

In accordance with certain embodiments, the space based subsystem further comprises a cross-connect switch that is configured to receive the plurality of demultiplexed RF signals produced by the first and second demultiplexers, and separate the plurality of demultiplexed RF signals into first and second subsets of demultiplexed RF signals. The first set of demultiplexed RF signals are accepted by the EOMs, optionally after being frequency up-converted and filtered prior to being accepted by the EOMs. The second set of demultiplexed RF signals are provided to the forward link equipment that is configured to produce and transmit the plurality of RF service downlink beams based on the second subset of the plurality of demultiplexed RF signals.

In accordance with certain embodiments, filters and/or frequency down-converters are included within signal paths between the cross-connect switch and the EOMs.

In accordance with certain embodiments, a specified RF frequency range within which the other satellite is configured to produce and transmit a plurality of RF service downlink beams comprises a downlink portion of the Ka band.

A system according to an embodiment of the present technology includes a ground based gateway subsystem configured to transmit an RF feeder uplink beam to a satellite. Additionally, the system includes a space based subsystem of the satellite, the space based subsystem configured to receive the RF feeder uplink beam that is transmitted by the ground based gateway subsystem. The space based subsystem is also configured to produce, in dependence on the RF feeder uplink beam, an optical ISL beam that is transmitted to another satellite. In specific embodiments, the ground based gateway subsystem includes a ground based beamformer that is used to produce the RF feeder uplink beam. In certain embodiments, the optical ISL beam, which is produced by the space based subsystem and transmitted to the other satellite, comprises a wavelength division multiplexed optical signal having RF frequencies within a same specified RF frequency range within which the other satellite is configured to transmit a plurality of RF service downlink beams, thereby eliminating any need for the other satellite to perform any frequency conversions when producing the plurality of RF service downlink beams in dependence on the optical ISL beam.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A subsystem of a satellite, the subsystem comprising:
one or more antennas configured to receive a radio frequency (RF) feeder uplink beam that is transmitted from a ground based gateway subsystem;
a polarizer configured to separate the RF feeder uplink beam into first and second RF signals that are orthogonal to one another;
first and second amplifiers configured to respectively amplify the first and second RF signals that are orthogonal to one another to thereby produce first and second amplified RF signals that are orthogonal to one another;
first and second demultiplexers configured demultiplex and thereby separate, respectively, each of the first and second amplified RF signals that are orthogonal to one another into a plurality of demultiplexed RF signals;
a plurality of lasers, each of the lasers operable to emit an optical signal having a different peak wavelength within a specified optical wavelength range;
a plurality of electro-optical modulators (EOMs), each EOM of the plurality of EOMs configured to accept an optical carrier signal from a respective one of the plurality of lasers, accept a different one of a subset of the plurality of demultiplexed RF signals, which is optionally frequency up-converted and filtered prior to being accepted by the EOM, and output a respective optical signal in dependence on the optical carrier signal and the demultiplexed RF signal accepted by the EOM;
a wavelength-division multiplexing (WDM) multiplexer configured to accept the optical signals output by the plurality of EOMs, and combine the plurality of optical signals into a wavelength division multiplexed optical signal;
an optical amplifier configured to amplify the wavelength division multiplexed optical signal to thereby produce an optically amplified wavelength division multiplexed optical signal; and
transmitter optics configured to accept the optically amplified wavelength division multiplexed optical signal and transmit an optical inter-satellite-link (ISL) beam to another satellite in dependence thereon.

2. The subsystem of claim 1, wherein the RF feeder uplink beam, that the one or more antennas is/are configured to receive from a ground based gateway subsystem, is produced in part using ground based beamforming.

3. The subsystem of claim 1, wherein the optically amplified wavelength division multiplexed optical signal that is accepted by the transmitter optics to produce and transmit an optical ISL beam to another satellite has RF frequencies within a same specified RF frequency range within which the other satellite is configured to transmit a plurality of RF service downlink beams, thereby eliminating any need for the other satellite to perform any frequency conversions when producing the plurality of RF service downlink beams in dependence on the optical ISL beam.

4. The subsystem of claim 1, further comprising filters within signal paths between the demultiplexers and the WDM multiplexer.

5. The subsystem of claim 1, wherein the specified optical wavelength range is either a contiguous, or a non-contiguous, optical wavelength range within an infrared (IR) spectrum.

6. The subsystem of claim 1, further comprising forward link equipment that is configured to produce and transmit a plurality of RF service downlink beams based on a second subset of the plurality of demultiplexed RF signals.

7. The subsystem of claim 6, further comprising a cross-connect switch that is configured to:
receive the plurality of demultiplexed RF signals produced by the first and second demultiplexers; and
separate the plurality of demultiplexed RF signals into first and second subsets of demultiplexed RF signals;
wherein the first set of demultiplexed RF signals are accepted by the EOMs, optionally after being frequency up-converted and filtered prior to being accepted by the EOMs; and
wherein the second set of demultiplexed RF signals are provided to the forward link equipment that is configured to produce and transmit the plurality of RF service downlink beams based on the second subset of the plurality of demultiplexed RF signals.

8. The subsystem of claim 7, further comprising filters within signal paths between the cross-connect switch and the EOMs.

9. The subsystem of claim 7, further comprising frequency down-converters within signal paths between the cross-connect switch and the EOMs.

10. The subsystem of claim 6, wherein a specified RF frequency range within which the other satellite is configured to produce and transmit a plurality of RF service downlink beams comprises a downlink portion of the Ka band.

11. A method for use by a subsystem of a satellite, the method comprising:
receiving a radio frequency (RF) feeder uplink beam that is transmitted from a ground based gateway sub system;
separating the RF feeder uplink beam into first and second RF signals that are orthogonal to one another;
amplifying the first and second RF signals that are orthogonal to one another to thereby produce first and second amplified RF signals that are orthogonal to one another;
demultiplexing and thereby separating each of the first and second amplified RF signals that are orthogonal to one another to collectively produce a plurality of demultiplexed RF signals;
emitting a plurality of optical carrier signals each having a different peak wavelength within a specified optical wavelength range;
at each of a plurality of electro-optical modulators (EOMs), accepting a different one of the plurality of optical carrier signals, accepting a different one of a subset of the plurality of demultiplexed RF signals, which is optionally frequency up-converted and filtered prior to being accepted by the EOM, and outputting a respective optical signal in dependence on the optical carrier signal and the demultiplexed RF signal accepted by the EOM;
multiplexing the optical signals output by the plurality of EOMs to thereby combine the plurality of optical signals into a wavelength division multiplexed optical signal;
amplifying the wavelength division multiplexed optical signal to thereby produce an optically amplified wavelength division multiplexed optical signal; and
providing the optically amplified wavelength division multiplexed optical signal to transmitter optics to thereby produce and transmit an optical inter-satellite-link (ISL) beam to another satellite.

12. The method of claim 11, wherein the RF feeder uplink beam, that is received from a ground based gateway subsystem, is produced in part using ground based beamforming.

13. The method of claim 11, wherein the optically amplified wavelength division multiplexed optical signal that is provided to transmitter optics to thereby produce and transmit an optical ISL beam to another satellite has RF frequencies within a same specified RF frequency range within which the other satellite is configured to transmit a plurality of RF service downlink beams, thereby eliminating any need for the other satellite to perform any frequency conversions when producing the plurality of RF service downlink beams in dependence on the optical ISL beam.

14. The method of claim 11, further comprising filtering each RF signal in the subset of the plurality of demultiplexed RF signals before providing the RF signal to a respective EOM.

15. The method of claim 11, wherein the specified optical wavelength range is either a contiguous, or a non-contiguous, optical wavelength range within an infrared (IR) spectrum.

16. The method of claim 11, further comprising producing and transmitting a plurality of RF service downlink beams based on a second subset of the plurality of demultiplexed RF signals.

17. The method of claim 16, further comprising:
separating the plurality of demultiplexed RF signals into first and second subsets of demultiplexed RF signals;
wherein the first set of demultiplexed RF signals are accepted by the EOMs, optionally after being frequency up-converted and filtered prior to being accepted by the EOMs; and
wherein the second set of demultiplexed RF signals are provided to forward link equipment that is used to produce and transmit the plurality of RF service downlink beams based on the second subset of the plurality of demultiplexed RF signals.

18. The method of claim 17, further comprising filtering each of the RF signals in the first set of demultiplexed RF signals before the RF signals are provided to and accepted by the EOMs.

19. The method of claim 17, further comprising frequency down-converting each of the RF signals in the first set of demultiplexed RF signals before the RF signals are provided to and accepted by the EOMs.

20. The method of claim 16, wherein a specified RF frequency range within which the satellite is configured to produce and transmit a plurality of RF service downlink beams comprises a downlink portion of the Ka band.

21. A system comprising:
a ground based gateway subsystem configured to transmit a radio frequency (RF) feeder uplink beam to a satellite; and
a subsystem of the satellite, the subsystem configured to
receive the RF feeder uplink beam that is transmitted by the ground based gateway sub system,
separate the RF feeder uplink beam into first and second RF signals that are orthogonal to one another, amplify the first and second RF signals that are orthogonal to one another to thereby produce first and second amplified RF signals that are orthogonal to one another, and demultiplex each of the first and second amplified RF signals that are orthogonal to one another to thereby collectively produce a plurality of demultiplexed RF signals;

the subsystem also configured to produce and transmit, in dependence on a first subset of the demultiplexed RF signals, an optical inter-satellite-link (ISL) beam that is transmitted to another satellite; and the subsystem also configured to produce and transmit, in dependence on a second subset of the demultiplexed RF signals, one or more RF service downlink beams that is/are transmitted to one or more service terminals.

22. The system of claim 21, wherein the ground based gateway subsystem includes a ground based beamformer that is used to produce the RF feeder uplink beam.

23. A system comprising:

a ground based gateway subsystem configured to transmit a radio frequency (RF) feeder uplink beam to a satellite; and a subsystem of the satellite, the subsystem configured to receive the RF feeder uplink beam that is transmitted by the ground based gateway subsystem;

the subsystem also configured to produce, in dependence on the RF feeder uplink beam, an optical inter-satellite-link (ISL) beam that is transmitted to another satellite;

wherein the optical ISL beam, which is produced by the subsystem and transmitted to the other satellite, comprises a wavelength division multiplexed optical signal having RF frequencies within a same specified RF frequency range within which the other satellite is configured to transmit a plurality of RF service downlink beams, thereby eliminating any need for the other satellite to perform any frequency conversions when producing the plurality of RF service downlink beams in dependence on the optical ISL beam.

24. The system of claim 21, wherein the subsystem includes a cross-connect switch that is configured to separate the plurality of demultiplexed RF signals into the first and second subsets of demultiplexed RF signals.

25. A subsystem for a satellite, the subsystem comprising:

one or more antennas configured to receive a radio frequency (RF) feeder uplink beam that is transmitted from a ground based gateway subsystem; and forward link equipment configured to produce, in dependence on the RF feeder uplink beam, an optical inter-satellite-link (ISL) beam that is transmitted to another satellite;

wherein the optical ISL beam, which is produced by the forward link equipment of the subsystem and transmitted to the other satellite, comprises a wavelength division multiplexed optical signal having RF frequencies within a same specified RF frequency range within which the other satellite is configured to transmit a plurality of RF service downlink beams, thereby eliminating any need for the other satellite to perform any frequency conversions when producing the plurality of RF service downlink beams in dependence on the optical ISL beam.

* * * * *

UNITED STATES PATENT AND TRADEMARK OFFICE
CERTIFICATE OF CORRECTION

| | |
|---|---|
| PATENT NO. | : 10,432,308 B1 |
| APPLICATION NO. | : 16/111008 |
| DATED | : October 1, 2019 |
| INVENTOR(S) | : Turgeon et al. |

Page 1 of 1

It is certified that error appears in the above-identified patent and that said Letters Patent is hereby corrected as shown below:

In the Claims

Column 36, Line 20, After "configured" and before "demultiplex" insert -- to --.

Column 37, Lines 40-41, After "gateway" and before ";" delete "sub system" and insert -- subsystem --.

Signed and Sealed this
Twenty-second Day of September, 2020

Andrei Iancu
*Director of the United States Patent and Trademark Office*